US012802326B2

(12) United States Patent
Haeberlen et al.

(10) Patent No.: US 12,802,326 B2
(45) Date of Patent: Nov. 17, 2026

(54) GRAPHICAL SIMULATION OF FLUID MOTION

(71) Applicant: Roblox Corporation, San Mateo, CA (US)

(72) Inventors: Andreas Haeberlen, Philadelphia, PA (US); Sheldon Paul Andrews, Hudson (CA)

(73) Assignee: Roblox Corporation, San Mateo, CA (US)

( * ) Notice: Subject to any disclaimer, the term of this patent is extended or adjusted under 35 U.S.C. 154(b) by 128 days.

(21) Appl. No.: 18/413,461

(22) Filed: Jan. 16, 2024

(65) Prior Publication Data

US 2025/0232508 A1 Jul. 17, 2025

(51) Int. Cl.

*G06T 13/60* (2011.01)
*G06T 15/00* (2011.01)
*G06T 19/00* (2011.01)

(52) U.S. Cl.

CPC .............. *G06T 13/60* (2013.01); *G06T 15/00* (2013.01); *G06T 19/00* (2013.01); *G06T 2219/024* (2013.01)

(58) Field of Classification Search

CPC ......... G06T 13/60; G06T 15/00; G06T 19/00; G06T 2219/024; G06F 30/20
See application file for complete search history.

(56) References Cited

U.S. PATENT DOCUMENTS

| | | | | |
|---|---|---|---|---|
| 6,801,930 B1 * | 10/2004 | Dionne | H04L 41/12 | 709/204 |
| 8,612,196 B2 * | 12/2013 | Rosedale | G06F 30/20 | 703/13 |
| 2005/0182603 A1 * | 8/2005 | Freitas | G06F 30/20 | 703/2 |

(Continued)

OTHER PUBLICATIONS

Damien Rioux-Lavoie, Ryusuke Sugimoto, TÃ1/4may Ãzdemir, Naoharu H. Shimada, Christopher Batty, Derek Nowrouzezahrai, and Toshiya Hachisuka. 2022. A Monte Carlo Method for Fluid Simulation. ACM Trans. Graph. 41, 6, Article 240 (Dec. 2022), 16 pages. (Year: 2022).*

(Continued)

*Primary Examiner* — Said Broome
*Assistant Examiner* — Jordan Wan Yick
(74) *Attorney, Agent, or Firm* — IP Spring

(57) ABSTRACT

Some implementations relate to methods, systems, and computer-readable media to render a graphical simulation of a fluid in a physical region in a virtual experience. In some implementations, the method includes dividing the physical region into cells, providing an initial state for each cell, calculating a fluid state for each cell at each of a plurality of consecutive time steps by determining pre-existing information for at least one cell to use when updating the fluid state of that cell, and recalculating the fluid state for each cell based on a previous fluid state of the cell and any external force affecting the cell, via Navier-Stokes equations. The recalculating uses the pre-existing information for each cell.

(Continued)

For example, the recalculating achieves a low computational cost by using the pre-existing information to avoid operations otherwise performed during the recalculating. Once the calculation is complete, the graphical simulation is rendered.

20 Claims, 17 Drawing Sheets

(56) References Cited

U.S. PATENT DOCUMENTS

| | | | | |
|---|---|---|---|---|
| 2005/0240384 | A1* | 10/2005 | Houston | G06F 30/23 703/9 |
| 2017/0294044 | A1* | 10/2017 | Yerli | H04L 67/04 |

OTHER PUBLICATIONS

Nuttapong Chentanez and Matthias MÃ1/4ller. 2011. Real-time Eulerian water simulation using a restricted tall cell grid. In ACM SIGGRAPH 2011 papers (SIGGRAPH '11). Association for Computing Machinery, New York, NY, USA, Article 82, 1â10. (Year: 2011).*

Haixiang Liu, et al., "Ascalable Schur-complement fluids solver for heterogeneous compute platforms," ACM Trans. Graph., vol. 35, No. 6, Article 201, Publication Date: Nov. 2016, 12 pages.

Jiafeng Liu, et al., "Automatic Quantization for Physics-Based Simulation," ACMTrans. Graph., vol. 41, No. 4, Article 51. Publication date: Jul. 2022, 15 pages.

Youkou Dong, et al., "Multiple-GPU parallelization of three-dimensional material point method based onsingle-root complex," Int J Numer Methods Eng. 2022; 123:1481-1504., Dec. 7, 2021, 24 Pages.

* cited by examiner

600f

GRAPHICAL SIMULATION OF FLUID MOTION

TECHNICAL FIELD

Implementations relate generally to performing fluid simulations using a computer.

BACKGROUND

When simulating an interactive virtual world, like a video game, it is sometimes relevant to simulate the behavior of fluids, such as the water in a lake. This task may be done with a process called "fluid simulation," which divides the space that the fluid occupies into many small cells (e.g., cubes) and then computes the behavior of the fluid in each cell based on the laws of physics. However, this process is computationally expensive. In a three-dimensional (3D) model of a fluid, the number of cells grows with $N^3$, and can be enormous in size (e.g., 1024*1024*1024). An ongoing simulation causes the computation to be re-run at least several times per second. Done naively, this uses expensive hardware (e.g., powerful GPUs) and a substantial amount of power.

Some implementations were conceived in light of the above.

The background description provided herein is for the purpose of presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

Implementations of this application relate to performing fluid simulations. For example, the fluid simulations use a variety of techniques to provide a low computational cost for the simulations.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by a data processing apparatus, cause the apparatus to perform the actions.

According to one aspect, a computer-implemented method to render a graphical simulation of a fluid in motion in a physical region in a virtual environment, wherein a state of the fluid is calculated in the physical region over consecutive time steps, is provided. The method comprises dividing a physical region in a virtual experience into cells; providing an initial fluid state for each of the cells; calculating a fluid state for each of the cells at each consecutive time step of a plurality of consecutive time steps, the calculating comprising: determining pre-existing information for each cell to use when updating the fluid state of that cell at the time step, wherein at least one cell has available pre-existing information; and recalculating the fluid state for each cell at the time step based on a previous fluid state of the cell and any external force affecting that cell, via Navier-Stokes equations, wherein the recalculating uses the pre-existing information; and rendering the graphical simulation based on the respective fluid state for each cell at each consecutive time step.

Various implementations of the computer-implemented method are described herein.

In some implementations, the pre-existing information is used for each cell to substitute for one or more operations otherwise performed during the recalculating.

In some implementations, the pre-existing information comprises identifiers of cells that are observable by a player's avatar and cells that are unobservable by the player's avatar, based on a location of the player's avatar and a location of the physical region, and the recalculating the fluid state comprises performing the recalculating for observable cells at a full precision and performing the recalculating for unobservable cells at a precision lower than the full precision.

In some implementations, the pre-existing information comprises cells that are observable by a player's avatar and cells that are unobservable by the player's avatar, based on a location of the player's avatar and a location of the physical region, wherein the recalculating the fluid state comprises performing the recalculating for observable cells at a full precision and omitting the recalculating for unobservable cells.

In some implementations, the simulation comprises a shared instance of a virtual experience that includes respective avatars corresponding to a plurality of players and a private instance of the virtual experience for each of the plurality of players, wherein the simulation for a player comprises shared cells defined in the shared instance of the virtual experience and private cells defined in the player's private instance of the virtual experience, wherein the pre-existing information comprises fluid states of the shared cells from the shared instance of the virtual experience, and wherein the recalculating the fluid state comprises performing the recalculating for the shared cells based on previous fluid states of the shared cells from the shared instance of the virtual experience and performing the recalculating for the private cells based on previous fluid states of the private cells from the player's private instance of the virtual experience.

In some implementations, the computer-implemented method further comprises receiving an external force applied in the player's private instance to a private cell at a location; propagating the external force to one or more proximate shared cells that are within a first threshold distance of the location of the private cell by determining a propagated effect of the external force on each of the proximate shared cells, wherein the propagated effect of the external force decreases as a distance from the location increases; converting cells from the proximate shared cells having corresponding propagated effects of the external force exceeding a second threshold into respective converted private cells; and applying the corresponding propagated effects of the external force to the respective converted private cells.

In some implementations, when an external force is applied in a player's private instance at a location of a shared cell shared by two avatars, the external force only affects that cell in the player's instance and the shared cell is split into two separate cells, wherein both separate cells are marked as private cells.

In some implementations, when an external force is applied in a player's private instance at a location of a shared cell shared by more than two avatars, the external force only affects that cell in the player's instance, that cell in the player's instance is marked as a separate private cell, and the shared cell is modified in the shared instance to indicate that the shared cell remains shared in any other players' instances that shared the shared cell prior to the external force being applied.

In some implementations, the computer-implemented method further comprises periodically comparing the fluid state of each private cell and the fluid state of a shared cell at corresponding locations in the region and returning the private cell to a shared state when a numerical metric of differences between the fluid states of the private cell and the shared cell at the same location in the region at a same time step is less than a threshold.

In some implementations, the pre-existing information comprises a cache of recent fluid states for each of the cells in the region at consecutive time steps and a cached digest summarizing each of the recent fluid states for each of the cells in the region in the cache at the consecutive time steps; wherein the recalculating further comprises: after recalculating the fluid states for each of the cells in the region at a time step, comparing a digest summarizing the fluid states for the cells in the region at the time step to the cached digests; and if the digest summarizing the fluid states for the cells in the region matches the cached digest for the cells in the region, using corresponding cached recent fluid states from the cache for the cells in the region to substitute for the recalculating by repeating the cached recent fluid states for the corresponding cells in the region as results of the recalculating until a time step occurs having an external force that affects at least one cell in the region.

In some implementations, the pre-existing information comprises a cache of recent fluid states for each cell of a subset of cells in the region at consecutive time steps and a cached digest summarizing each of the recent fluid states for each cell of the subset of cells in the region in the cache at the consecutive time steps; wherein the recalculating further comprises: after recalculating the fluid state for each cell of the subset of cells in the region at a time step, comparing a digest summarizing the fluid states for the subset of cells in the region at the time step to the cached digests; and if the digest summarizing the fluid states for the subset of cells in the region matches the cached digest for the subset of cells in the region, using corresponding cached recent fluid states from the cache for the subset of cells in the region to substitute for the recalculating for the subset of cells in the region by repeating the cached recent fluid states for the subset of cells in the region as results of the recalculating until a time step occurs having an external force that affects at least one cell in the subset of cells in the region.

According to another aspect, a non-transitory computer-readable medium is provided. The non-transitory computer-readable medium has instructions stored thereon that, responsive to execution by a processing device, causes the processing device to perform operations comprising: dividing a physical region in a virtual experience into cells; providing an initial fluid state for each of the cells; calculating a fluid state for each of the cells at each consecutive time step of a plurality of consecutive time steps, the calculating comprising: determining pre-existing information for each cell to use when updating the fluid state of that cell at the time step, wherein at least one cell has available pre-existing information; and recalculating the fluid state for each cell at the time step based on a previous fluid state of the cell and any external force affecting the cell, via Navier-Stokes equations, wherein the recalculating uses the pre-existing information; and rendering a graphical simulation based on the respective fluid state for each cell at each consecutive time step.

Various implementations of the non-transitory computer-readable medium are described herein.

In some implementations, the pre-existing information comprises identifiers of cells that are observable by a player's avatar and cells that are unobservable by the player's avatar, based on a location of the player's avatar and a location of the physical region, and wherein the recalculating the fluid state comprises performing the recalculating for observable cells at a full precision and performing the recalculating for unobservable cells at a precision lower than the full precision.

In some implementations, the simulation comprises a shared instance of a virtual experience that includes respective avatars corresponding to a plurality of players and a private instance of the virtual experience for each of the plurality of players, wherein the simulation for a player comprises shared cells defined in the shared instance of the virtual experience and private cells defined in the player's private instance of the virtual experience, wherein the pre-existing information comprises fluid states of the shared cells from the shared instance of the virtual experience, and wherein the recalculating the fluid state comprises performing the recalculating for the shared cells based on previous fluid states of the shared cells from the shared instance of the virtual experience and performing the recalculating for the private cells based on previous fluid states of the private cells from the player's private instance of the virtual experience.

In some implementations, the pre-existing information comprises a cache of recent fluid states for each of the cells in the region at consecutive time steps and a cached digest summarizing each of the recent fluid states for each of the cells in the region in the cache at the consecutive time steps, wherein the recalculating further comprises: after recalculating the fluid states for each of the cells in the region at a time step, comparing a digest summarizing the fluid states for the cells in the region at the time step to the cached digests; and if the digest summarizing the fluid states for the cells in the region matches the cached digest for the cells in the region, using corresponding cached recent fluid states from the cache for the cells in the region to substitute for the recalculating by repeating the cached recent fluid states for the corresponding cells in the region as results of the recalculating until a time step occurs having an external force that affects at least one cell in the region.

In some implementations, the pre-existing information is used for each cell to substitute for one or more operations otherwise performed during the recalculating.

According to another aspect, a system is disclosed, comprising: a memory with instructions stored thereon; and a processing device, coupled to the memory, the processing device configured to access the memory, wherein the instructions when executed by the processing device cause the processing device to perform operations including: dividing a physical region in a virtual experience into cells; providing an initial fluid state for each of the cells; calculating a fluid state for each of the cells at each consecutive time step of a plurality of consecutive time steps, the calculating comprising: determining pre-existing information for each cell to use when updating the fluid state of that cell at the time step, wherein at least one cell has available pre-existing information; and recalculating the fluid state for each cell at the time step based on a previous fluid state of the cell and any external force affecting the cell, via Navier- Stokes equations, wherein the recalculating uses the pre-existing information; and rendering a graphical simulation based on the respective fluid state for each cell at each consecutive time step.

Various implementations of the system are described herein.

In some implementations, the pre-existing information comprises identifiers of cells that are observable by a player's avatar and cells that are unobservable by the player's avatar, based on a location of the player's avatar and a location of the physical region, and wherein the recalculating the fluid state comprises performing the recalculating for observable cells at a full precision and performing the recalculating for unobservable cells at a precision lower than the full precision.

In some implementations, the simulation comprises a shared instance of a virtual experience that includes respective avatars corresponding to a plurality of players and a private instance of the virtual experience for each of the plurality of players, wherein the simulation for a player comprises shared cells defined in the shared instance of the virtual experience and private cells defined in the player's private instance of the virtual experience, wherein the pre-existing information comprises fluid states of the shared cells from the shared instance of the virtual experience, and wherein the recalculating the fluid state comprises performing the recalculating for the shared cells based on previous fluid states of the shared cells from the shared instance of the virtual experience and performing the recalculating for the private cells based on previous fluid states of the private cells from the player's private instance of the virtual experience.

In some implementations, the pre-existing information comprises a cache of recent fluid states for each of the cells in the region at consecutive time steps and a cached digest summarizing each of the recent fluid states for each of the cells in the region in the cache at the consecutive time steps, wherein the recalculating further comprises: after recalculating the fluid states for each of the cells in the region at a time step, comparing a digest summarizing the fluid states for the cells in the region at the time step to the cached digests; and if the digest summarizing the fluid states for the cells in the region matches the cached digest for the cells in the region, using corresponding cached recent fluid states from the cache for the cells in the region to substitute for the recalculating by repeating the cached recent fluid states for the corresponding cells in the region as results of the recalculating until a time step occurs having an external force that affects at least one cell in the region.

According to yet another aspect, portions, features, and implementation details of the systems, methods, and non-transitory computer-readable media may be combined to form additional aspects, including some aspects which omit and/or modify some portions of individual components or features, include additional components or features, and/or other modifications, and all such modifications are within the scope of this disclosure.

DETAILED DESCRIPTION

Figure 1:
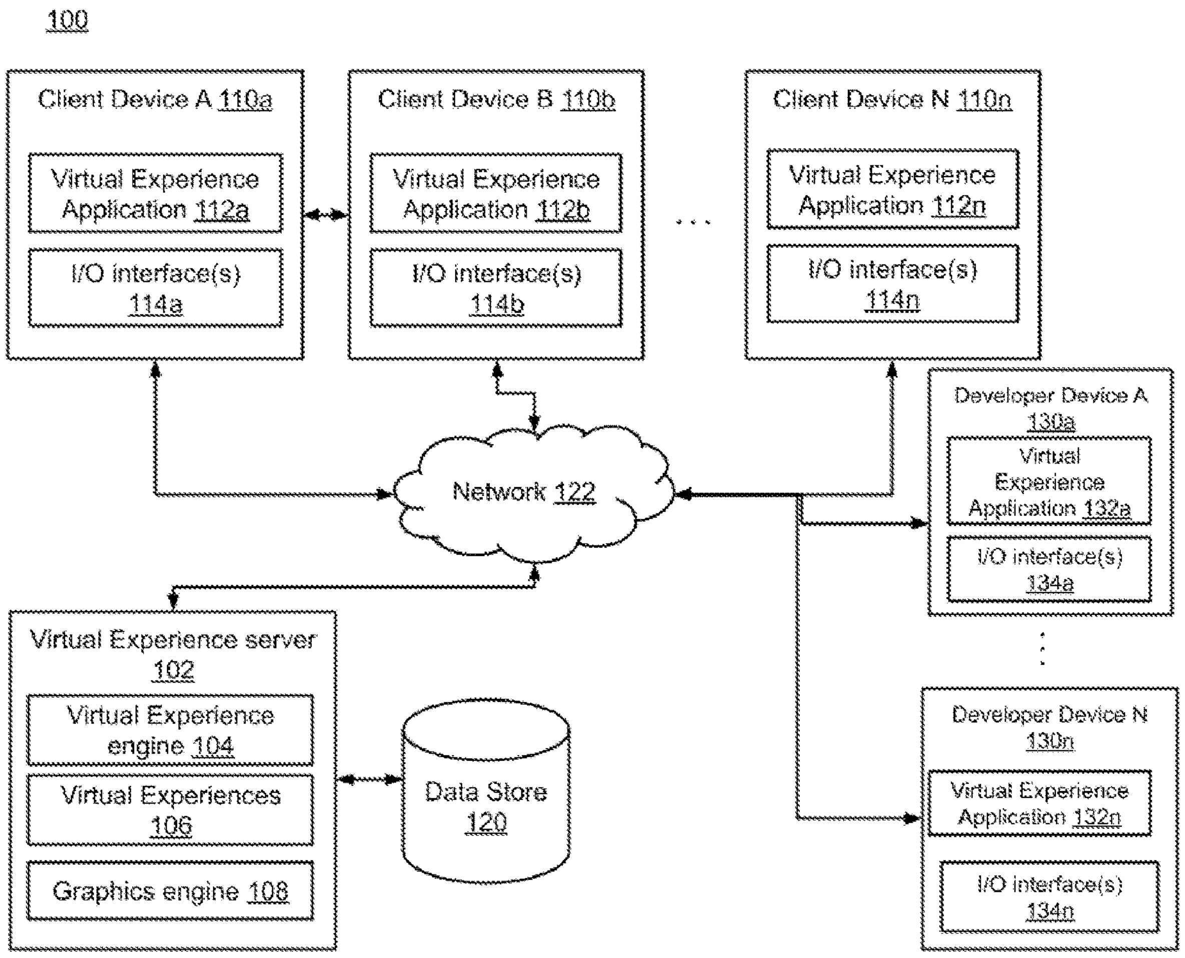
FIG. 1 is a diagram of an example system architecture for fluid simulation with a low computational cost, in accordance with some implementations.

In the following detailed description, reference is made to the accompanying drawings, which form a part hereof. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented herein. Aspects of the present disclosure, as generally described herein, and illustrated in the Figures, can be arranged, substituted, combined, separated, and designed in a wide variety of different configurations, all of which are contemplated herein.

References in the specification to "some implementations", "an implementation", "an example implementation", etc. indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, such feature, structure, or characteristic may be effected in connection with other implementations whether or not explicitly described.

One or more implementations described herein relate to achieving low computational costs when performing fluid simulations. The low computational costs may be achieved by using pre-existing information when performing the fluid simulations. For example, there may be pre-existing information about which cells in the fluid are observable and which are not observable, and it may be possible to use lower precision for or even avoid updating cells that are not observable. Further, multiple instances may be concurrently active and it may be possible to share information between instances. Additionally, fluid states may repeat over time and it may be possible to cache and reuse fluid states.

Thus, the proposed implementations are designed to provide a low computational cost for a simulation. They are based on three key insights. First, sometimes, only parts of the fluid can be observed. As an example, only part of a lake is observable because the players are gathered at one end of the lake and cannot see the other end. In this case, the state of the unobservable part of the fluid is irrelevant from the players' point of view.

Second, sometimes multiple instances of the same simulation are concurrently active. For example, there may be N copies of the same virtual world. However, there may be different players in each copy of the virtual world. In this case, some parts of the fluid computation may be redundant. The redundant computations can be reused across multiple instances. Thus, the overall computational cost can be amortized or made low as compared to alternative approaches by avoiding performing redundant computations and improving efficiency of the simulation.

Third, fluid states tend to recur over time, especially when there is a steady state flow. Hence, the computation might repeatedly arrive at the same, or similar, overall state or sequence of states.

Accordingly, some implementations may leverage these insights as follows.

First, some implementations may keep track of which parts of the fluid are currently near and/or observable by the players. The computation for these near and/or observable parts can be run at full precision. The computation for the unobservable parts can be done with much lower precision, or even be suspended entirely. Technically, a full suspension might likely cause some artifacts (e.g., improper rendering of the fluid) in the observable parts of the fluid. However, if the suspended part is sufficiently far away from the player (s), the artifacts may be very small and are not likely to be perceivable. Notice that this approach may be possible because virtual worlds have a concept of "visibility" and can often tolerate small artifacts.

Second, when multiple instances of the same world are running in parallel, it may be possible to maintain a single copy of the fluid simulation and use outputs of that single copy for multiple instances. Naively implemented, this approach would encounter issues because disturbances (i.e., external forces) in one instance (e.g., a player dropping a big rock into a lake) would have to either affect every instance, or none of them.

However, it may be possible to manage this issue as follows. For each cell in the fluid simulation, the simulation may keep track of whether the cell is currently "private" or "shared." If a cell is shared, the simulation tracks by how many instances. If a given cell is shared by $N>1$ instances and a disturbance affects that cell in one of the instances, the simulation creates an exact, private copy of the cell. The private copy is marked as not being shared for that instance. The original is marked as shared only if $N>2$, such that there are at least two other instances that still use it. Otherwise, the original cell is marked as private to the remaining instance.

Conceptually, the fluid simulation for a given instance then consists of a) the shared cells, where no private cell exists for that instance, and b) that instance's private cells. By using this approach, the computation complexity is now $O(S+P)$ instead of $O(k*S)$, where S and P are the number of shared and private cells, and k is the number of instances.

Two additional refinements may help make this technique work well. First, notice that cells propagate effects to nearby cells. For example, a river in a cell would generate a flow to the cells next to that cell. If the effects on a neighboring cell X differ substantially between a private cell and its shared counterpart, a private copy of X may also be generated. However, the differences may be "diluted" (i.e., attenuated) with distance. The net effect is that private cells exist only in a small neighborhood around a disturbance. The rest of the fluid may remain shared. The exact meaning of "substantially" depends on the artifacts that a given simulation may be able to tolerate.

The definition of "substantially" could correspond to a threshold T that triggers cloning into private cells whenever the difference between the flow of the original cell and the private counterpart is larger than T. In some implementations, velocity field and density field values may be considered in various ways. The lower T is, the more closely the resulting state resembles that of the baseline algorithm in which all instances have their own, separate simulations. However, such a lower T leads to higher computational overhead.

The overhead occurs because the number of private cells grows with T. If $T=0$, the simulation uses an extreme design in which the computation is shared only when the states of multiple instances are identical. In this scenario, even a small disturbance would trigger a clone of the entire fluid. Such an approach would result in few artifacts, but would include a significant amount of computation. In practice, T would be set at the highest level that does not cause visible artifacts in most situations. Such a value of T could be determined by experimentation or estimation using heuristics.

The second refinement is a way to reintegrate cloned cells with the original, shared cells whenever their states become sufficiently close to each other again. Without this capability, a cell that has become private may remain private forever. Accordingly, the ability to benefit from the shared simulation would deteriorate over time.

However, the simulation may occasionally check whether the "distance" (i.e. a metric of difference) between the state of a private cell and the shared counterpart for the private cell has become smaller than some threshold $T_2$. The simulation may delete the private cell whenever this is the case. Then, the fluid may eventually return to a fully shared state after a disturbance. In the original example, where a player drops a rock into a lake, the rock would cause ripples for a while but eventually the ripples would subside and the lake would return to the original, undisturbed, and shared state.

Finally, computational costs may be kept low based on the third insight of recurring states. For this insight, the observation is that in a steady state (i.e., a state without outside disturbances), fluid states may recur frequently. For instance, in one example, suppose that a steady wind blows across a lake from the same, constant direction. Eventually, this wind causes a static wave pattern. Naively, the simulation would compute this pattern again and again.

However, it may be possible to avoid this issue by caching a few recent fluid states and by reusing these states when possible. For instance, the simulation could store a cache of the last $S_1 \ldots S_k$ states in memory. The simulation could store each state with a digest $H(S_i)$ of the state. Such a digest could be a simplified version of the state that would help to detect whether another state is the same or close to that state. Then, after each computation step, the simulation could compute a digest H(S) of the current fluid state S. That digest would be compared to the digests of the past states.

If a match $H(S)=H(S_i)$ is found, the simulation could stop active calculation of new states and consider the past state $S_i$ to be the current state. Without further disturbances, it becomes possible to simply cycle through the cached states. Because $S_i+1$ was computed from $S_i$ and the computation is deterministic, the same states would happen if the computations were repeated. So the state of the fluid may now cycle through $S_i$, $S_i+1$, . . . , $S_k$ without any actual computation, until a disturbance occurs.

A more sophisticated version of this approach would be to cache the states of smaller regions. Perhaps the wind is blowing across one end of the lake, while a player drops a rock into the other end of the lake. In this case, a naive implementation would recompute the entire state because the disturbance due to the rock would prevent the overall state from recurring. However, the states at the windy end of the lake are still reoccurring, even if the ones at the end with the rock are not. Caching the states of smaller regions separately may help to avoid this issue.

Thus, in some implementations, when simulating a fluid, various techniques provide ways to reuse data and modify or avoid calculations in a way that achieves a low computational cost of fluid simulations as compared to other approaches that do not take advantage of these techniques to effectively minimize resource usage.

FIG. 1—System Architecture

FIG. 1 is a diagram of an example system architecture for fluid simulation with a low computational cost, in accordance with some implementations. FIG. 1 and the other figures use like reference numerals to identify similar elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110*a*," "110*b*," and/or "110*n*" in the figures).

The system architecture 100 (also referred to as "system" herein) includes online virtual experience server 102, data store 120, client devices 110*a*, 110*b*, and 110*n* (generally referred to as "client device(s) 110" herein), and developer devices 130*a* and 130*n* (generally referred to as "developer device(s) 130" herein). Virtual experience server 102, data store 120, client devices 110, and developer devices 130 are coupled via network 122. In some implementations, client device(s) 110 and developer device(s) 130 may refer to the same or same type of device.

Online virtual experience server 102 can include, among other things, a virtual experience engine 104, one or more virtual experiences 106, and graphics engine 108. In some implementations, the graphics engine 108 may be a system, application, or module that permits the online virtual experience server 102 to provide graphics and animation capability. In some implementations, the graphics engine 108 may perform one or more of the operations described below in connection with the flowcharts shown in FIGS. 3A-3C, 5B, 6B, 6D, and 6F. A client device 110 can include a virtual experience application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

A developer device 130 can include a virtual experience application 132, and input/output (I/O) interfaces 134 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof.

In some implementations, the data store 120 may be a non-transitory computer readable memory (e.g., random access memory), a cache, a drive (e.g., a hard drive), a flash drive, a database system, or another type of component or device capable of storing data. The data store 120 may also include multiple storage components (e.g., multiple drives or multiple databases) that may also span multiple computing devices (e.g., multiple server computers). In some implementations, data store 120 may include cloud-based storage.

In some implementations, the online virtual experience server 102 can include a server having one or more computing devices (e.g., a cloud computing system, a rackmount server, a server computer, cluster of physical servers, etc.). In some implementations, the online virtual experience server 102 may be an independent system, may include multiple servers, or be part of another system or server.

In some implementations, the online virtual experience server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online virtual experience server 102 and to provide a user with access to online virtual experience server 102. The online virtual experience server 102 may also include a website (e.g., a web page) or application back-end software that may be used to provide a user with access to content provided by online virtual experience server 102. For example, users may access online virtual experience server 102 using the virtual experience application 112 on client devices 110.

In some implementations, virtual experience session data are generated via online virtual experience server 102, virtual experience application 112, and/or virtual experience application 132, and are stored in data store 120. With permission from virtual experience participants, virtual experience session data may include associated metadata, e.g., virtual experience identifier(s); device data associated with the participant(s); demographic information of the participant(s); virtual experience session identifier(s); chat transcripts; session start time, session end time, and session duration for each participant; relative locations of participant avatar(s) within a virtual experience environment; purchase(s) within the virtual experience by one or more participant(s); accessories utilized by participants; etc.

In some implementations, online virtual experience server 102 may be a type of social network providing connections between users or a type of user-generated content system that allows users (e.g., end-users or consumers) to communicate with other users on the online virtual experience server 102, where the communication may include voice chat (e.g., synchronous and/or asynchronous voice communication), video chat (e.g., synchronous and/or asynchronous video communication), or text chat (e.g., 1:1 and/or N:N synchronous and/or asynchronous text-based communication). A record of some or all user communications may be stored in data store 120 or within virtual experiences 106. The data store 120 may be utilized to store chat transcripts (text, audio, images, etc.) exchanged between participants.

In some implementations, the chat transcripts are generated via virtual experience application 112 and/or virtual experience application 132 or and are stored in data store 120. The chat transcripts may include the chat content and associated metadata, e.g., text content of chat with each message having a corresponding sender and recipient(s); message formatting (e.g., bold, italics, loud, etc.); message timestamps; relative locations of participant avatar(s) within a virtual experience environment, accessories utilized by virtual experience participants, etc. In some implementations, the chat transcripts may include multilingual content, and messages in different languages from different sessions of a virtual experience may be stored in data store 120.

In some implementations, chat transcripts may be stored in the form of conversations between participants based on the timestamps. In some implementations, the chat transcripts may be stored based on the originator of the message(s).

In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online virtual experience server 102 may be a virtual gaming server. For example, the gaming server may provide single-player or multiplayer games to a community of users that may access a "system" herein) includes online gaming server 102, data store 120, client or interact with virtual experiences using client devices 110 via network 122. In some implementations, virtual experiences (including virtual realms or worlds, virtual games, other computer-simulated environments) may be two-dimensional (2D) virtual experiences, three-dimensional (3D) virtual experiences (e.g., 3D user-generated virtual experiences), virtual reality (VR) experiences, or augmented reality (AR) experiences, for example. In some implementations, users may participate in interactions (such as gameplay) with other users. In some implementations, a virtual experience may be experienced in real-time with other users of the virtual experience.

In some implementations, virtual experience engagement may refer to the interaction of one or more participants using client devices (e.g., 110) within a virtual experience (e.g., 106) or the presentation of the interaction on a display or other output device (e.g., 114) of a client device 110. For example, virtual experience engagement may include interactions with one or more participants within a virtual experience or the presentation of the interactions on a display of a client device.

In some implementations, a virtual experience 106 can include an electronic file that can be executed or loaded using software, firmware or hardware configured to present the virtual experience content (e.g., digital media item) to an entity. In some implementations, a virtual experience application 112 may be executed and a virtual experience 106 rendered in connection with a virtual experience engine 104. In some implementations, a virtual experience 106 may have a common set of rules or common goal, and the environment of a virtual experience 106 shares the common set of rules or common goal. In some implementations, different virtual experiences may have different rules or goals from one another.

In some implementations, virtual experiences may have one or more environments (also referred to as "virtual experience environments" or "virtual environments" herein) where multiple environments may be linked. An example of an environment may be a three-dimensional (3D) environment. The one or more environments of a virtual experience 106 may be collectively referred to as a "world" or "virtual experience world" or "gaming world" or "virtual world" or "universe" herein. An example of a world may be a 3D world of a virtual experience 106. For example, a user may build a virtual environment that is linked to another virtual environment created by another user. A character of the virtual experience may cross the virtual border to enter the adjacent virtual environment.

It may be noted that 3D environments or 3D worlds use graphics that use a three-dimensional representation of geometric data representative of virtual experience content (or at least present virtual experience content to appear as 3D content whether or not 3D representation of geometric data is used). 2D environments or 2D worlds use graphics that use two-dimensional representation of geometric data representative of virtual experience content.

In some implementations, the online virtual experience server 102 can host one or more virtual experiences 106 and can permit users to interact with the virtual experiences 106 using a virtual experience application 112 of client devices 110. Users of the online virtual experience server 102 may play, create, interact with, or build virtual experiences 106, communicate with other users, and/or create and build objects (e.g., also referred to as "item(s)" or "virtual experience objects" or "virtual experience item(s)" herein) of virtual experiences 106.

For example, in generating user-generated virtual items, users may create characters, decoration for the characters, one or more virtual environments for an interactive virtual experience, or build structures used in a virtual experience 106, among others. In some implementations, users may buy, sell, or trade virtual experience objects, such as in-platform currency (e.g., virtual currency), with other users of the online virtual experience server 102. In some implementations, online virtual experience server 102 may transmit virtual experience content to virtual experience applications (e.g., 112). In some implementations, virtual experience content (also referred to as "content" herein) may refer to any data or software instructions (e.g., virtual experience objects, virtual experience, user information, video, images, commands, media item, etc.) associated with online virtual experience server 102 or virtual experience applications. In some implementations, virtual experience objects (e.g., also referred to as "item(s)" or "objects" or "virtual objects" or "virtual experience item(s)" herein) may refer to objects that are used, created, shared or otherwise depicted in virtual experience applications 106 of the online virtual experience server 102 or virtual experience applications 112 of the client devices 110. For example, virtual experience objects may include a part, model, character, accessories, tools, weapons, clothing, buildings, vehicles, currency, flora, fauna, components of the aforementioned (e.g., windows of a building), and so forth.

It may be noted that the online virtual experience server 102 hosting virtual experiences 106, is provided for purposes of illustration. In some implementations, online virtual experience server 102 may host one or more media items that can include communication messages from one user to one or more other users. With user permission and express user consent, the online virtual experience server 102 may analyze chat transcripts data to improve the virtual experience platform. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a virtual experience 106 may be associated with a particular user or a particular group of users (e.g., a private virtual experience), or made widely available to users with access to the online virtual experience server 102 (e.g., a public virtual experience). In some implementations, where online virtual experience server 102 associates one or more virtual experiences 106 with a specific user or group of users, online virtual experience server 102 may associate the specific user(s) with a virtual experience 106 using user account information (e.g., a user account identifier such as username and password).

In some implementations, online virtual experience server 102 or client devices 110 may include a virtual experience engine 104 or virtual experience application 112. In some implementations, virtual experience engine 104 may be used for the development or execution of virtual experiences 106. For example, virtual experience engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the virtual experience engine 104 may generate commands that help compute and render the virtual experience (e.g., rendering commands, collision commands, physics commands, etc.) In some implementations, virtual experience applications 112 of client devices 110, respectively, may work independently, in collaboration with virtual experience engine 104 of online virtual experience server 102, or a combination of both.

In some implementations, both the online virtual experience server 102 and client devices 110 may execute a virtual experience engine (104 and 112, respectively). The online virtual experience server 102 using virtual experience engine 104 may perform some or all the virtual experience engine functions (e.g., generate physics commands, rendering commands, etc.), or offload some or all the virtual experience engine functions to virtual experience engine 104 of client device 110. In some implementations, each virtual experience 106 may have a different ratio between the virtual experience engine functions that are performed on the online virtual experience server 102 and the virtual experience engine functions that are performed on the client devices 110. For example, the virtual experience engine 104 of the online virtual experience server 102 may be used to generate physics commands in cases where there is a collision between at least two virtual experience objects, while the additional virtual experience engine functionality (e.g., generate rendering commands) may be offloaded to the client device 110. In some implementations, the ratio of virtual experience engine functions performed on the online virtual experience server 102 and client device 110 may be changed (e.g., dynamically) based on virtual experience engagement conditions. For example, if the number of users engaging in a particular virtual experience 106 exceeds a threshold number, the online virtual experience server 102 may perform one or more virtual experience engine functions that were previously performed by the client devices 110.

For example, users may be playing a virtual experience 106 on client devices 110, and may send control instructions (e.g., user inputs, such as right, left, up, down, user election, or character position and velocity information, etc.) to the online virtual experience server 102. Subsequent to receiving control instructions from the client devices 110, the online virtual experience server 102 may send experience instructions (e.g., position and velocity information of the characters participating in the group experience or commands, such as rendering commands, collision commands, etc.) to the client devices 110 based on control instructions. For instance, the online virtual experience server 102 may perform one or more logical operations (e.g., using virtual experience engine 104) on the control instructions to generate experience instruction(s) for the client devices 110. In other instances, online virtual experience server 102 may pass one or more or the control instructions from one client device 110 to other client devices (e.g., from client device 110*a* to client device 110*b*) participating in the virtual experience 106. The client devices 110 may use the experience instructions and render the virtual experience for presentation on the displays of client devices 110.

In some implementations, the control instructions may refer to instructions that are indicative of actions of a user's character within the virtual experience. For example, control instructions may include user input to control action within the experience, such as right, left, up, down, user selection, gyroscope position and orientation data, force sensor data, etc. The control instructions may include character position and velocity information. In some implementations, the control instructions are sent directly to the online virtual experience server 102. In other implementations, the control instructions may be sent from a client device 110 to another client device (e.g., from client device 110*b* to client device 110*n*), where the other client device generates experience instructions using the local virtual experience engine 104. The control instructions may include instructions to play a voice communication message or other sounds from another user on an audio device (e.g., speakers, headphones, etc.), for example voice communications or other sounds generated using the audio spatialization techniques as described herein.

In some implementations, experience instructions may refer to instructions that enable a client device 110 to render a virtual experience, such as a multiparticipant virtual experience. The experience instructions may include one or more of user input (e.g., control instructions), character position and velocity information, or commands (e.g., physics commands, rendering commands, collision commands, etc.).

In some implementations, characters (or virtual experience objects generally) are constructed from components, one or more of which may be selected by the user, that automatically join together to aid the user in editing.

In some implementations, a character is implemented as a 3D model and includes a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/type of body parts; proportion (e.g. shoulder and hip ratio); head size; etc.

One or more characters (also referred to as an "avatar" or "model" herein) may be associated with a user where the user may control the character to facilitate a user's interaction with the virtual experience 106.

In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools.

In some implementations, for some asset types, e.g. shirts, pants, etc. the online virtual experience platform may provide users access to simplified 3D virtual object models that are represented by a mesh of a low polygon count, e.g. between about 20 and about 30 polygons.

In some implementations, the user may also control the scale (e.g., height, width, or depth) of a character or the scale of components of a character. In some implementations, the user may control the proportions of a character (e.g., blocky, anatomical, etc.). It may be noted that in some implementations, a character may not include a character virtual experience object (e.g., body parts, etc.) but the user may control the character (without the character virtual experience object) to facilitate the user's interaction with the virtual experience (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online virtual experience server 102. In some implementations, creating, modifying, or customizing characters, other virtual experience objects, virtual experiences 106, or virtual experience environments may be performed by a user using an I/O interface (e.g., developer interface) and with or without scripting (or with or without an application programming interface (API)). It may be noted that for purposes of illustration, characters are described as having a humanoid form. It may further be noted that characters may have any form such as a vehicle, animal, inanimate object, or other creative form.

In some implementations, the online virtual experience server 102 may store characters created by users in the data store 120. In some implementations, the online virtual experience server 102 maintains a character catalog and virtual experience catalog that may be presented to users. In some implementations, the virtual experience catalog includes images of virtual experiences stored on the online virtual experience server 102. In addition, a user may select a character (e.g., a character created by the user or other user) from the character catalog to participate in the chosen virtual experience. The character catalog includes images of characters stored on the online virtual experience server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online virtual experience server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online virtual experience server 102 at any given moment. It may be noted that the number of client devices 110 is provided as illustration. In some implementations, any number of client devices 110 may be used.

In some implementations, each client device 110 may include an instance of the virtual experience application 112, respectively. In one implementation, the virtual experience application 112 may permit users to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to client device 110 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application may be an online virtual experience server application for users to build, create, edit, upload content to the online virtual experience server 102 as well as interact with online virtual experience server 102 (e.g., engage in virtual experiences 106 hosted by online virtual experience server 102). As such, the virtual experience application may be provided to the client device(s) 110 by the online virtual experience server 102. In another example, the virtual experience application may be an application that is downloaded from a server.

In some implementations, each developer device 130 may include an instance of the virtual experience application 132, respectively. In one implementation, the virtual experience application 132 may permit a developer user(s) to use and interact with online virtual experience server 102, such as control a virtual character in a virtual experience hosted by online virtual experience server 102, or view or upload content, such as virtual experiences 106, images, video items, web pages, documents, and so forth. In one example, the virtual experience application may be a web application (e.g., an application that operates in conjunction with a web browser) that can access, retrieve, present, or navigate content (e.g., virtual character in a virtual environment, etc.) served by a web server. In another example, the virtual experience application may be a native application (e.g., a mobile application, app, virtual experience program, or a gaming program) that is installed and executes local to developer device 130 and allows users to interact with online virtual experience server 102. The virtual experience application may render, display, or present the content (e.g., a web page, a media viewer) to a user. In an implementation, the virtual experience application may also include an embedded media player (e.g., a Flash® or HTML5 player) that is embedded in a web page.

According to aspects of the disclosure, the virtual experience application 132 may be an online virtual experience server application for users to build, create, edit, upload content to the online virtual experience server 102 as well as interact with online virtual experience server 102 (e.g., provide and/or engage in virtual experiences 106 hosted by online virtual experience server 102). As such, the virtual experience application may be provided to the device(s) 130 by the online virtual experience server 102. In another example, the virtual experience application 132 may be an application that is downloaded from a server. Game application 132 may be configured to interact with online virtual experience server 102 and obtain access to user credentials, user currency, etc. for one or more virtual experiences 106 developed, hosted, or provided by a virtual experience developer.

In some implementations, a user may login to online virtual experience server 102 via the virtual experience application. The user may access a user account by providing user account information (e.g., username and password) where the user account is associated with one or more characters available to participate in one or more virtual experiences 106 of online virtual experience server 102. In some implementations, with appropriate credentials, a virtual experience developer may obtain access to virtual experience virtual objects, such as in-platform currency (e.g., virtual currency), avatars, special powers, accessories, that are owned by or associated with other users.

In general, functions described in one implementation as being performed by the online virtual experience server 102 can also be performed by the client device(s) 110, or a server, in other implementations if appropriate. In addition, the functionality attributed to a particular component can be performed by different or multiple components operating together. The online virtual experience server 102 can also be accessed as a service provided to other systems or devices through suitable application programming interfaces (APIs), and thus is not limited to use in websites.

Figure 2:
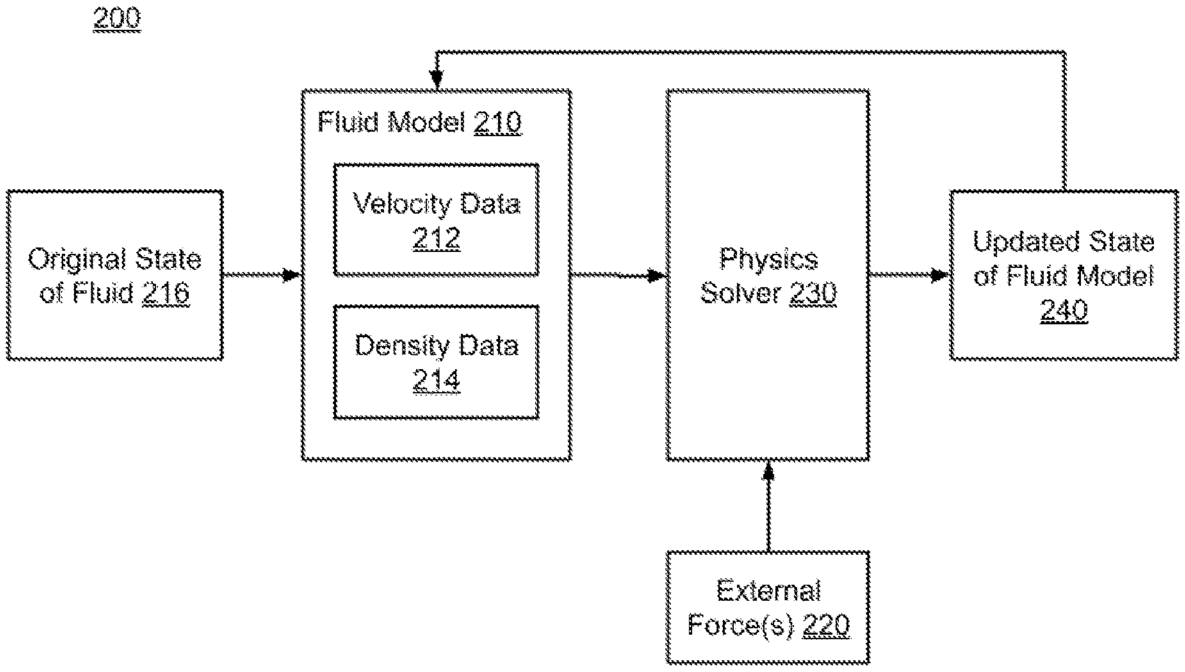
FIG. 2 depicts a diagram of a physics engine analyzing data being processed by a physics solver utilized for fluid simulation, in accordance with some implementations.

FIG. 2—Physics Solver

FIG. 2 depicts a diagram of a physics engine 200 analyzing data being processed by a physics solver 230 utilized for fluid simulation, in accordance with some implementations. Utilization of a physics solver 230 for simulation of fluid motion includes two primary stages: a velocity field update stage, and a density update stage. The velocity field stage updates velocities for cells in a region. The density update stage determines the response of density in the fluid to the velocity field, while confirming that constraints for the fluid motion are met.

These stages are repeated as the status of the fluid changes over time in a simulation. The physics solver 230 may be utilized to track the fluid motion. In some implementations, fluid motion may be rendered in real-time or near real-time as the state of the fluid is updated. Alternatively, the fluid motion may be rendered at set time intervals, or after a simulation of the fluid is complete.

A physics engine 200 may include a physics solver 230 that is utilized to determine an updated state of a simulated fluid within the virtual environment. An output of a physics engine 200 and/or a physics solver 230 may be utilized to display an updated state of one or more fluids within the virtual environment. Enabling real-time (or near real-time) updates of motion of fluids within a virtual environment may be enabled by a computationally efficient physics solver 230 that can accurately determine an updated state within time limits imposed for such computation(s).

Additionally, the physics solver 230 is implemented to account for various types of possible fluids designed by users and still not be susceptible to instabilities. That is, the physics solver 230 avoids unacceptable artifacts that occur by omitting too much calculation. A physics engine 200 and/or physics solver 230 can improve computational performance across devices in the online virtual environment platform while also providing an acceptable user experience, e.g., by displaying fluids in the virtual environment with an acceptable level of artifacts while still achieving a low amount of computation.

FIG. 2 depicts an example physics solver 230 utilized to simulate fluids, in accordance with some implementations. The example physics solver 230 may be utilized by an online virtual experience platform to simulate motion of fluids under the influence of forces in a virtual experience.

A fluid object is an idealized approximation to a gas or liquid. The fluid may be modeled as being incompressible. Such a fluid may be modeled by the Navier-Stokes equations. These equations provide a physically based mathematical description for simulating fluids in motion. In particular, the equations referred to herein are those used for incompressible fluids. These equations are used in computational fluid dynamics to model the behavior of fluids.

For example, the Navier-Stokes equations specify, using a partial differential equation, that the change of a velocity field for a fluid over a time step may be found based on advection pressure, diffusion, and external forces. The equation is governed by a condition that the divergence of the vector field has to be zero, which ensures that the fluid is mass conserving and incompressible. Another aspect of the Navier-Stokes equations is a somewhat similar equation that uses a partial differential equation to model the change of the density field based on the velocity field over a time step. The density field may be modeled by advection, diffusion, dissipation, and an external source.

The physics solver 230 may be utilized within a physics engine 200 to track and render motion of fluids that may be part of a virtual experience in the virtual environment, and to determine the effects of external forces such as gravity, buoyancy and convection. These effects may model phenomena such as smoke and heat, hardening and melting, wind, etc., that affect a fluid as the virtual experience proceeds from one update period (i.e., a time step) and/or display window to the next. External forces include forces that can influence the flow and behavior of a simulation but exist out of it, like wind or gravity. External forces may also include influences by a user, such as influences applied by a user's avatar.

In some implementations, a display frame rate may be determined by a processor, e.g., a graphics card and refers to a number of frames a system is able to produce in a second. A refresh rate may be based on a rate at which a monitor is able to completely refresh a display. The physics solver 230 may operate at a rate based on an update period that may be different from the display frame rate and the refresh rate. In some implementations, the update period may be determined by an update period that is used to meet a threshold accuracy and/or stability of mathematical solutions that govern the graphical simulation of a fluid in a virtual experience.

The physics solver 230 may be implemented as part of virtual experience server 102 and may be included within a virtual experience engine 104 and/or graphics engine 108. In some implementations, a physics solver 230 may be included within a physics engine 200.

In some implementations, the physics solver 230 may be implemented within one or more client devices 110 or one or more developer devices 130. In some implementations, functionality of a physics solver 230 may be implemented across one or more devices, e.g., between virtual experience server 102, client device 110, or developer device 130.

As depicted in FIG. 2, the physics solver 230 takes as inputs fluid model(s) 210, including velocity data 212 and density data 214 and external forces 220 acting on the fluid. The fluid model 210 may be initialized based on an original state of the fluid 216. In some implementations, one or more of these inputs may not be utilized (e.g., external forces 220) under certain situations (e.g., when the fluid is not subjected to external forces at a given time step). In some implementations, additional inputs can be provided to the physics solver 230. The physics solver 230 generates as output an updated state of the fluid model 240, based on the combined effect on the inputs described earlier. The updated state of the fluid model 240 is provided as feedback to fluid model 210. Thus, this process of updating continues until a simulation is complete.

In some implementations, the fluid model 210 is a representative model of a corresponding fluid object and may include information about the fluid object, e.g., shape, dimension, material properties, etc. In some implementations, the fluid model 210 may include additional information that pertains to body physics, e.g., moment of inertia, center of gravity, center of mass, etc.

Velocity data 212 may be obtained by velocity modeling. Such velocity modeling may be implemented within a physics engine 200 or physics solver 230, e.g., as a module. Velocity modeling for a fluid within a virtual environment is modeled based on differential equations, such as the Navier-Stokes equations. Such modeling may use a finite difference equation to provide an appropriate numerical solution that discretizes the Navier-Stokes equations, which are partial differential equations.

Density data is obtained by density modeling, which may be implemented within a physics engine 200 or a physics solver 230, e.g., as a module. Density modeling for a fluid within a virtual environment is modeled based on differential equations, such as the Navier-Stokes equations. Such modeling may use a finite difference equation that subjects density to external forces and the modeled velocity field.

An input state of the fluid 216 may be input to the fluid model 210 as an initial state, e.g., at the start/commencement of a simulation. For example, an input state may be an initial state of a lake in a virtual environment, just before the lake starts moving under the influence of wind.

Inputs to the physics solver 230 may also include external force(s) that act on the fluid within the virtual environment, e.g., a gravitational force that is acting on masses associated with cells in a fluid. The external force(s) may be a default setting within the environment (such as gravity), user defined settings (such as a user set temperature), or a combination.

For example, a specified force associated with an avatar and an input setting provided by a user (e.g., using a game stick or remote) may be utilized to obtain a force acting on a fluid based on an avatar's actions. Similarly, a user may specify a gravity-free setting for a virtual environment, which results in simulation of a gravity-free virtual environment, e.g., gravitational forces would not be applied on the fluid.

Based on provided inputs, the physics solver 230 determines an updated state of the fluid model 240 by solving for the motion of cells in the fluid under the influence of various provided inputs.

The updated state of the fluid model 240 is determined by the physics solver 230 by applying the laws of physics as defined within the virtual environment, such as expressed by applying the Navier-Stokes equations (or a related discrete difference equation), to the fluid. An exact determination, however, can be prohibitively expensive. Hence, real-time simulation of fluid motion is performed by the use of approximate techniques. This approximation enables suitable performance, e.g., by completion of simulation within a provided time window, while providing physically realistic results. In an online virtual environment, the simulation is to maintain adherence to the basic laws of physics within a reasonable tolerance (while managing computational demands).

One approximation technique utilized is to discretize the motion of the fluid object using time-stepping. The equations of motion of fluid objects can be difficult to solve easily. The discretization subdivides the motion into small time increments, wherein the equations are simplified and linearized, thereby enabling an approximate solution. During each time step, the motion of the relevant parts (such as cells) of fluids that are associated with velocities and densities may be approximated. The physics solver 230 is utilized to solve the equations of motion for velocity and density for a time step to obtain an updated state of a fluid object 240.

In some implementations, an iterative method may be utilized to solve the equations of motion, wherein with each iteration, an approximate solution for an updated state of the fluid object is obtained. Such an approach models the fluid over time while remaining close to a true solution. A final accuracy of a solution may be based on a precision used in iterations performed by the physics solver 230.

However, the physics solver 230 presented in FIG. 2 may be computationally expensive. In some implementations, the physics solver 230 may calculate updates for every cell at full precision at each time step. If a fluid is modeled in three dimensions, the number of cells grows at a cubic rate. Even if a fluid is modeled in two dimensions, the number of cells grows at a quadratic rate. If it is possible to avoid modeling some of the cells or use a low precision when modeling all or some of the cells, this could result in a low computational expense compared to one that the physics solver 230 would otherwise handle. Such management of computational expense may be especially useful because the fluid simulations performed in virtual environments operate in real-time.

Figure 3A:
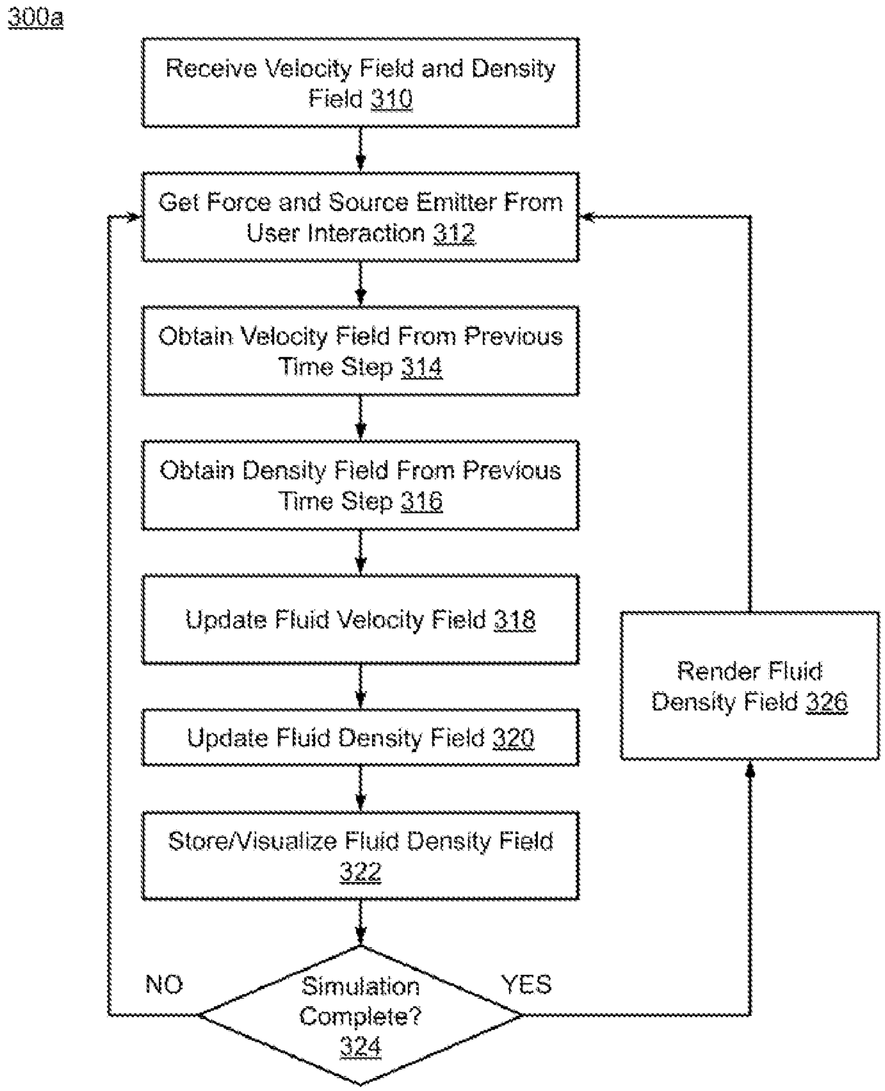
FIG. 3A is a flowchart of a method for fluid simulation, in accordance with some implementations.

FIG. 3A—Method for Fluid Simulation

FIG. 3A is a flowchart of a method 300*a* for fluid simulation, in accordance with some implementations. Further, the method 300*a* may be used along with techniques to achieve a low computational cost for fluid simulations. In some implementations, method 300*a* can be implemented, for example, on a virtual experience server 102 described with reference to FIG. 1. In some implementations, some or all of the method 300*a* can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 300*a*. In some implementations, different components of one or more servers and/or clients can perform different blocks or other parts of the method 300*a*. In some examples, a first device is described as performing blocks of method 300*a*. Some implementations can have one or more blocks of method 300*a* performed by one or more other devices (e.g., other client devices or server devices) that can send results or data to the first device. Method 300*a* may begin at block 310. Method 300*a* takes a velocity field and a density field for the fluid being simulated. When method 300*a* is complete, the velocity field may become a divergence free velocity field, and the density field is moved to enact the results of the simulation.

At block 310, velocity field data and density field data are received. At block 310, the velocity field data and density field data have appropriate initial values, which may be obtained from the virtual environment. These initial values are representative of each portion of the fluid being modeled. For example, the fluid may be divided into cells. If the fluid is represented in three-dimensions (3D), in some implementations, the cells may be cubic cells. In other implementations, the cells may take on different shapes, such as rectangular solids.

Block 310 may be followed by block 312. At block 312, one iteration of the updating begins. External force information and source emitter information are received from user interaction. For example, external forces may be defined by preexisting emitters, or by defined user interactions. For example, such external forces may help simulate natural phenomena that influence the fluid. One external force is Newtonian gravity. Unless gravity is modeled, particles act as if they are in freefall. Other phenomena that are related to Newtonian gravity include buoyancy and convection, which may help model heat and smoke. Convection may also consider heat and temperature information. Other external forces and influences could include hardening, melting, and wind.

However, other external forces may not be due to natural phenomena, and may be created by user actions and influences. For example, if a user's avatar throws a stone in a pond, or rows in a rowboat on a pond, these movements are artificial in nature. However, it is still useful to model these artificial effects. Block 312 may be followed by block 314.

At block 314, velocity field information may be obtained from a previous time step. Such a velocity field provides a vector representing a velocity associated with each cell in the fluid being simulated at each time step. Each cell in the fluid may be associated with a velocity vector at each point in time. For example, the velocity for a given location at a given time may correspond to a direction and a magnitude.

For a velocity field value, the direction may correspond in a three-dimensional (3D) environment to a direction. In some implementations, the direction may be specified as i, j, and k components. The vector may also be associated with a magnitude (i.e., speed), such as a metric of distance per time unit. The metric of distance may be an appropriate metric of distance for the virtual experience being modeled. In general, the time unit may be second or a fraction of a second (such as a millisecond). The time unit may correspond to the time step used for performing the rendering. Block 314 may be followed by block 316.

At block 316, density field information may be obtained from a previous time step. The density field represents a density of particles. When rendering the fluid, the density of particles may provide a way to visualize movement within the fluid, in that areas of increased density may look different from areas with comparatively low density. Each cell in the fluid may be associated with a value for density at a given position and time. Such density value may be a scalar. Block 316 may be followed by block 318.

At block 318, the fluid velocity field may be updated. An example method used to perform the updating of the fluid velocity field is presented as method 300*b* in FIG. 3B. At a high level, this method involves receiving the velocity field, adding any forces, advecting, diffusing, and projecting, which may result in a divergence-free velocity field that can be used to affect the density field. Block 318 may be followed by block 320.

At block 320, the fluid density field may be updated. An example method used to perform the updating of the fluid density field is presented as method 300*c* in FIG. 3C. At a high level, this method involves receiving the updated velocity field and density field, adding the forces to the density field, advecting the density field, diffusing the density field, dissipating the density field, and providing the moved density field. Block 320 may be followed by block 322.

At block 322, the updated fluid density field is stored for subsequent rendering. For example, the updated fluid density field may be associated with a time step that indicates relative densities at that time step. Block 322 may be followed by block 324.

At block 324, it may be determined whether a simulation is complete or ready for rendering. For example, the simulation may be considered complete or ready for rendering based on different criteria, depending on how a given implementation is structured. For example, in some implementations, an entire simulation may be carried out, storing each fluid density field. In such implementations, only after the entire simulation is completely finished is the field rendered. In other implementations, a set number of instances are stored, and then the rendering occurs. In yet other implementations, every time an update occurs or every time a condition occurs the rendering occurs. For example, the rendering may occur when a series of instances begin to repeat.

Based on a determination that the simulation is complete or ready for rendering, block 324 is followed by block 326. Else, block 324 is followed by block 312, at which point another update cycle for the velocity field and the density field occurs.

At block 326, the fluid density field is rendered. For example, the fluid density field may provide indications about how the fluid in each cell behaves. Based on the fluid density field, a rendering engine associated with the virtual environment may provide a corresponding graphical representation. Block 326 may be followed by block 312, at which another update to the fluid occurs that can continue the simulation process.

Figure 3B:
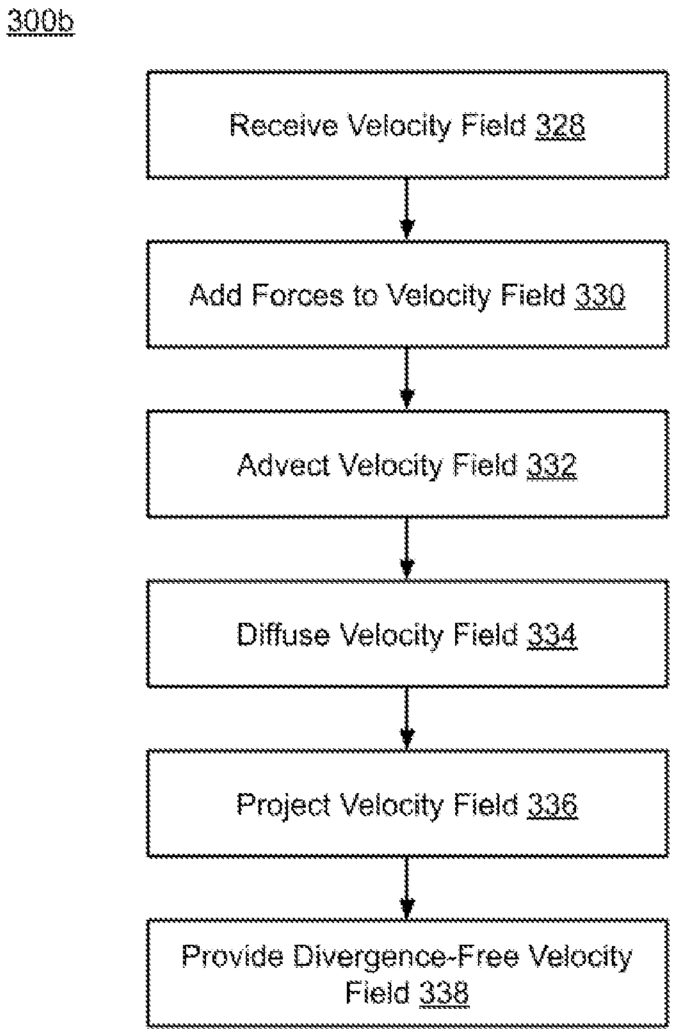
FIG. 3B is a flowchart of a method for updating a velocity field in a fluid simulation, in accordance with some implementations.

FIG. 3B —Method for Updating Velocity Field

FIG. 3B is a flowchart of a method 300*b* for updating a velocity field in a fluid simulation, in accordance with some implementations. Further, the method 300*b* may be used along with techniques to achieve a low computational cost for fluid simulations. In some implementations, method 300*b* can be implemented, for example, on a virtual experience server 102 described with reference to FIG. 1. In some implementations, some or all of the method 300*b* can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 300*b*. In some implementations, different components of one or more servers and/or clients can perform different blocks or other parts of the method 300*b*. In some examples, a first device is described as performing blocks of method 300*b*. Some implementations can have one or more blocks of method 300*b* performed by one or more other devices (e.g., other client devices or server devices) that can send results or data to the first device. Method 300*b* may begin at block 328.

At block 328, velocity field information is received. Such velocity field information associates a direction and a magnitude of a velocity vector with each cell in the modeled fluid. For example, it may be possible to perform the operations of FIG. 3B by beginning with an initial velocity field variable, and swapping its value with another velocity field variable at each successive step of method 300*b*. Once the velocity field information is received, the velocity field information is ready for updating. Block 328 may be followed by block 330.

At block 330, forces are added to the velocity field. For example, the initial velocity field is updated by taking each initial velocity and adding a value of the relevant force field multiplied by a time step. This product is another velocity value, and hence updates the velocity values in the field to reflect the effects of the force. Such an operation may be accomplished using an explicit numerical integration technique like Euler integration. If more than one force affects the fluid, those forces may be summed before applying the total force to the cells. Block 330 may be followed by block 332.

At block 332, an advection operation is performed on the velocity field. Advection refers to the effects of the velocity field upon itself at each time step. Such an operation may be non linear and methods may not be numerically stable. One technique for performing the advection operation may be a technique called the method of characteristics. This method may track fluid particles in the velocity field based on following the streamline from a previous time step to a current time step. For example, this method may be achieved through linear interpolation and particle tracing techniques. Block 332 may be followed by block 334.

At block 334, a diffusion operation is performed on the velocity field. Diffusion refers to swirling effects that may occur because regions inside the flow are moving faster than others. This behavior is referred to as diffusion and exists because of the viscosity of fluid. Viscosity describes how resistive fluid is at a specific cell, point, or region to being moved. To perform diffusion, it may be possible to use a numerically stable method that calculates the diffusion term. This leads to a sparse linear system to determine the velocity field. Such a linear system may be solved in a numerically stable way using an iterative implicit scheme, such as Gauss-Seidel relaxation. Block 334 may be followed by block 336.

At block 336, a projection operation is performed on the velocity field. The projection projects the velocity field to make the velocity field divergence free. For example, the projection operation involves solving a Poisson equation. For example, a numerical solution of the equation may be obtained using the method of characteristics, which leads to a linear system. Various approaches may be used to solve the Poisson equation. The divergence free property of the velocity field ensures that the velocity field is incompressible and mass conserving. Block 336 may be followed by block 338.

At block 338, a divergence-free velocity field may be provided for use in updating the density field. As noted, by performing the projection operation on the velocity field, the resulting velocity field is divergence free and may accordingly be incompressible and mass conserving. By providing the updated velocity field, it may be able to implement appropriate effects onto the fluid by updating the fluid's density field based on the updated velocity field (along with any external influences).

Figure 3C:
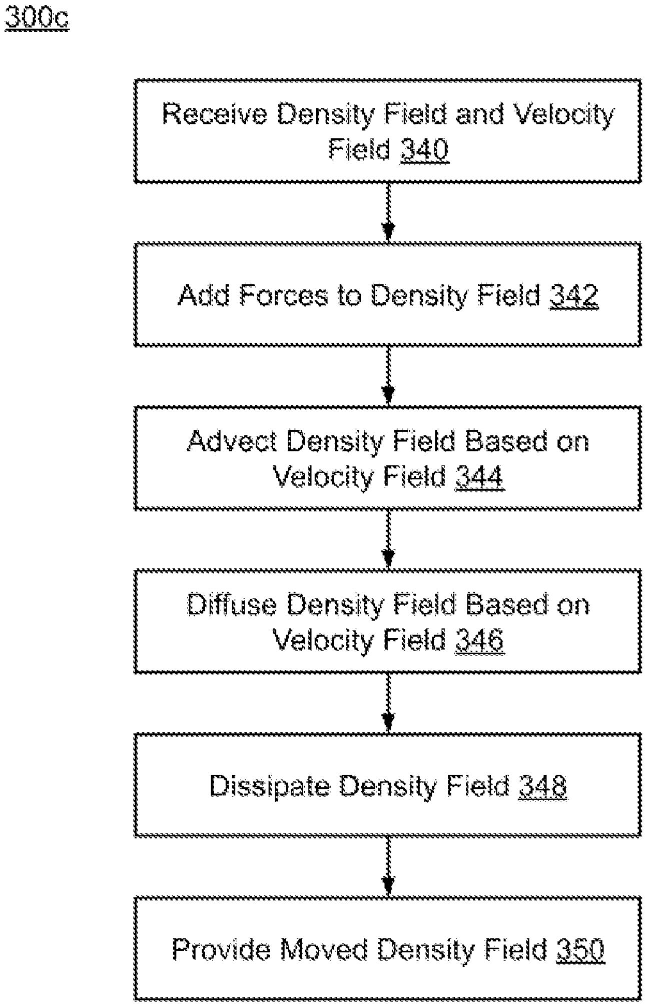
FIG. 3C is a flowchart of a method for updating a density field in a fluid simulation, in accordance with some implementations.

FIG. 3C—Method for Updating Density Field

FIG. 3C is a flowchart of a method 300*c* for updating a density field in a fluid simulation, in accordance with some implementations. Further, the method 300*c* may be used along with techniques to achieve a low computational cost for fluid simulations. In some implementations, method 300*c* can be implemented, for example, on a virtual experience server 102 described with reference to FIG. 1. In some implementations, some or all of the method 300*c* can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 300*c*. In some implementations, different components of one or more servers and/or clients can perform different blocks or other parts of the method 300*c*. In some examples, a first device is described as performing blocks of method 300*c*. Some implementations can have one or more blocks of method 300*c* performed by one or more other devices (e.g., other client devices or server devices) that can send results or data to the first device. Method 300*c* may begin at block 340.

At block 340, density field information and velocity field information are received. The density field information may be accessed from the density field information generated at the last time step. The velocity field information may correspond to the velocity field information that was updated previously. Block 340 may be followed by block 342.

At block 342, sources may be added to the density field. Such forces may be based on the source emitter term associated with the density equation. For example, the user interacts with the fluid by selecting a spatial location on the grid used to define the fluid and applies an input. Such an input may act as a particle emitter corresponding to the source term in the density equation that moves densities within the flow. Block 342 may be followed by block 344.

At block 344, an advection operation is applied to the density field based on the velocity field. Such an advection operation may be similar to the advection operation applied to the velocity field. For example, the velocity field is used to move portions of density within the density field. In some implementations, portions of the density field may be moved based on determining pressure field values and multiplying them by masses associated with the density field and time step values. Block 344 may be followed by block 346.

At block 346, a diffusion operator is applied to the density field based on the velocity field. Such a diffusion operation may be similar to the diffusion operation applied to the velocity field. Thus, diffusion for the density field reflects viscosity of a fluid. However, the diffusion of the density field may be based on a diffusion constant rather than a fluid's velocity. Block 346 may be followed by block 348.

At block 348, a dissipation operator is applied to the density field. Dissipation refers to a rate at which the masses dissipate or scatter inside the fluid flow. The dissipation may be modeled based on a constant which is referred to as the dissipation rate. In some cases, the fluid may be modeled without taking dissipation into account. In such implementations, the dissipation rate is set to zero, and hence dissipation does not have an effect on the behavior of masses in the fluid. Block 348 may be followed by block 350.

At block 350, moved density fluid information is provided for use and storage when rendering the fluid simulation. For example, the moved density fluid information includes a density value for each cell in the simulated fluid. Based on such density fluid information, the fluid may be rendered in a manner that illustrates the density obtained by the method.

Figure 3D:
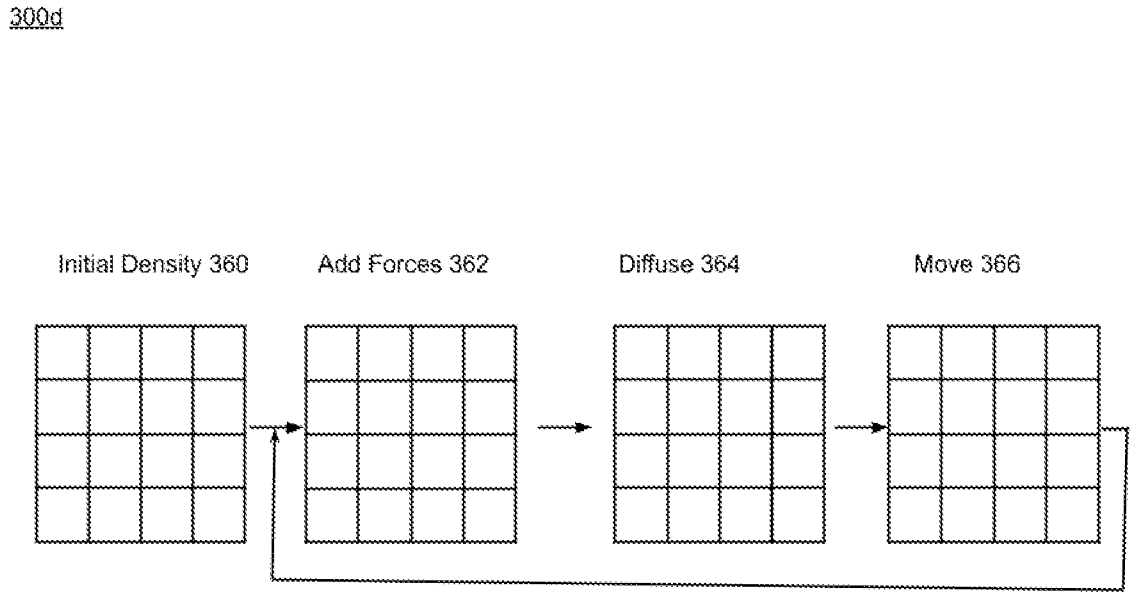
FIG. 3D is a diagram of updating a grid-based fluid simulation, in accordance with some implementations.

FIG. 3D—Diagram of Updating Density Field

FIG. 3D is a diagram 300*d* of updating a grid-based fluid simulation, in accordance with some implementations. In FIG. 3D, there is an initial density field 360 associated with a group of cells for a region. While the cells are shown in FIG. 3D as square, two-dimensional (2D) cells in a square, 2D region, it may be recognized that, in some implementations, analogous approaches may be adapted appropriately for 3D cells in a 3D region.

Grids divide the fluid into cells. The cells may be cubic, or may be rectangular solids with a predefined length, width, and depth. The cells lead to a spatial partitioning that can allow discrete numerical solutions to the Navier-Stokes equations that model the fluid. Density information may be stored at vertices or centers of the cells. For example, each cell face may store a velocity value and density values may be stored at cross over points. Such approaches may be used for three dimensional solutions for volume rendering techniques.

Because the Navier-Stokes equations are partial differential solutions, a numerical solution has to be discretized into a finite difference equation. Solving the Navier-Stokes equations involves the use of instances of each of a gradient operator, a divergence operator, a Laplacian operator, and Poisson equations. Each of these mathematical entities may correspond to discrete difference equations that use values for the grid spacing and the grid position. These operations may be approximated in two or three-dimensions, as appropriate. A variety of approximation strategies are available, where there are trade-offs made between execution time and accuracy.

To update the density field, a succession of operations repeats. For example, the density field is updated by an add forces operation 362, a diffuse operation 364, and then a move operation 366. These operations cycle, such that after move operation 366 is complete, a new sequence of add forces operation 362, diffuse operation 364, and move operation 366 occur to update the density field again.

At the add forces operation 362, a grid with values corresponding to sources is added to the density grid. This operation is simple to implement by taking the density grid and adding to each cell the product of the source grid and the time step. The add forces operation 362 may be followed by the diffusion operation 364.

At the diffusion operation 364, velocity and density values are moved based on the turbulence of the velocity field. This occurs by spreading density values based on a given rate of diffusion. Hence, for each cell, the diffusion operation 364 exchanges velocity and density values with the direct neighbors of the cell. The diffusion operation 364 may be followed by the advection operation 366. At the advection operation 366, substances in the fluid are transported in accordance with the velocity field. Hence, density values are propagated throughout the grid based on the velocity field values to another grid position that is based on evaluating an advection term.

Both the diffusion operation 364 and the move operation 366 each often involve a divergence calculation, which may be a bottleneck of a simulation. Such a divergence calculation may be a part of the calculations for a simulation it would be helpful to avoid, because resources for such divergence calculations grow at a cubic rate for a three-dimensional (3D) simulation with a dimension N. Techniques discussed that reduce N or cache and/or approximate results for sub-regions may thus provide large performance gains.

Figure 4:
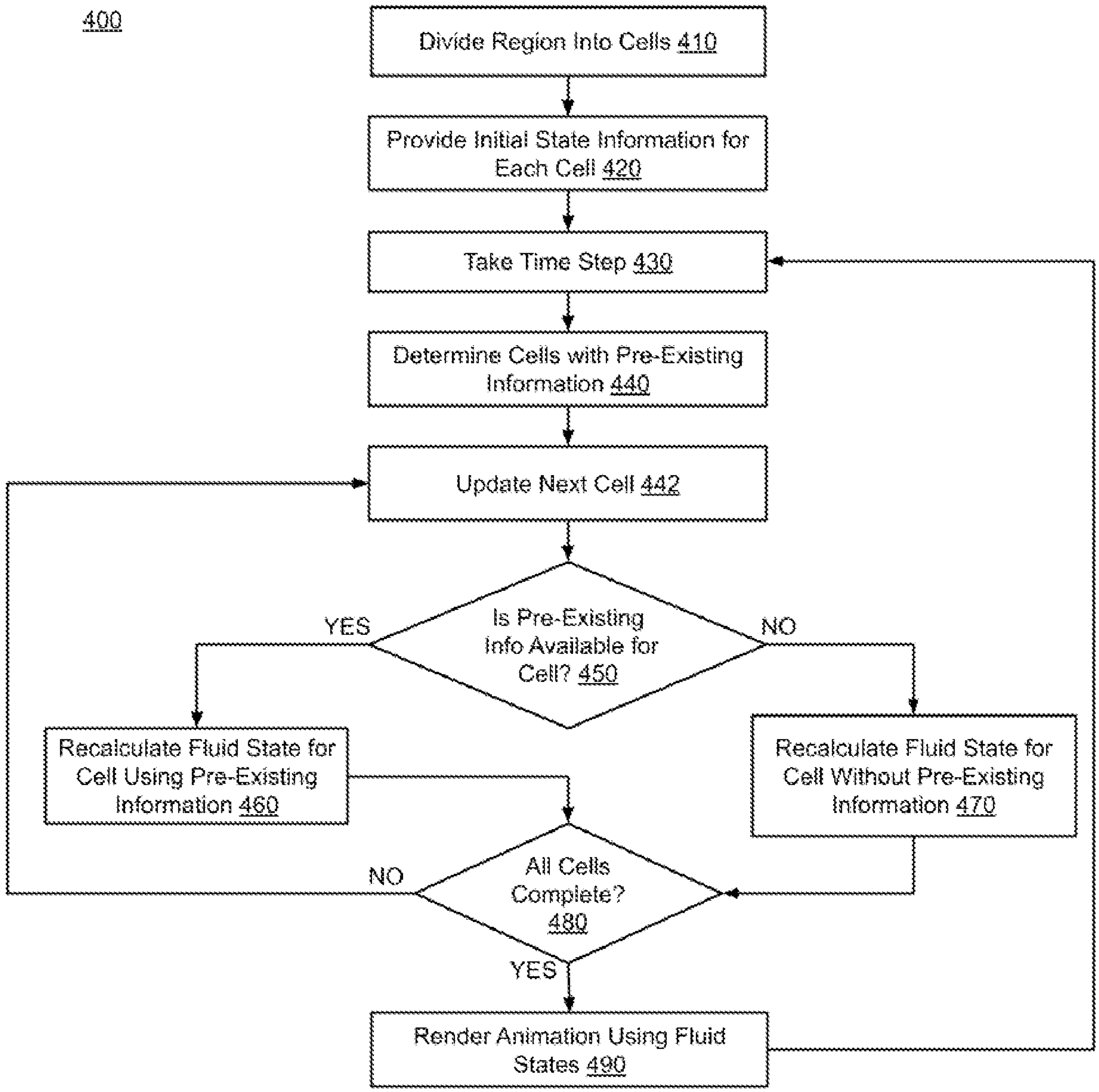
FIG. 4 is a flowchart of a method for fluid simulation with a low computational cost, in accordance with some implementations.

FIG. 4—Flowchart of Method for Fluid Simulation

FIG. 4 is a flowchart of a method 400 for fluid simulation with a low computational cost, in accordance with some implementations. In addition to simulating the behavior of a fluid, the method 400 may be used to perform fluid simulations with a low computational cost. In some implementations, method 400 can be implemented, for example, on a virtual experience server 102 described with reference to FIG. 1. In some implementations, some or all of the method 400 can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 400. In some implementations, different components of one or more servers and/or clients can perform different blocks or other parts of the method 400. In some examples, a first device is described as performing blocks of method 400. Some implementations can have one or more blocks of method 400 performed by one or more other devices (e.g., other client devices or server devices) that can send results or data to the first device. Method 400 may begin at block 410.

At block 410, a region including fluid to be simulated may be divided into cells. For example, the region may be a two-dimensional region or a three-dimensional region. Accordingly, the cells may be squares or cubes. Alternatively, the cells may be rectangles or rectangular solids of a uniform length, width, and depth. The values of the length, width, and depth may be chosen to provide adequate performance in that smaller cells may provide increased accuracy but then there may be more cells and an increased computing burden. As the size of the region grows, the number of cells increases rapidly. For example, in a 2D simulation of a square region with side length N, the number of cells corresponds to an order of $N^2$, and in a 3D simulation of a cubic region with side length N, the number of cells corresponds to an order of $N^3$. By dividing the region into cells, it allows for modeling the region using discrete values. Block 410 may be followed by block 420.

At block 420, initial state information may be provided for each of the cells. Such initial state information may include a value of a velocity field (including a direction and a magnitude of the velocity field) and a value of a density field (including an amount of mass per volume) associated with that cell. The velocity field characterizes how matter in the cell moves. The density field characterizes a distribution of matter in each cell. Block 420 may be followed by block 430.

At block 430, a time step advances for the simulation. The time step may be an amount of time used to discretize a numerical solution for the equations used to model the fluid. A shorter time step may lead to greater accuracy, in that the discrete solution is closer to the original partial differential equation. However, a shorter time step leads to more operations, and especially if the simulation is to be performed in real time or near real time, it may be helpful to have a longer time step to allow enough calculations to be made. For example, the time step may be chosen to ensure that there is enough time to do the rendering based on how often the rendered simulation is to be updated. Block 430 may be followed by block 440.

At block 440, it is determined which cells have pre-existing information. Such pre-existing information may be information that can avoid performing certain operations when recalculating the fluid state. For example, the pre-existing information may include information that may allow certain operations that would otherwise be involved as a part of the recalculation to be omitted and/or simplified.

In some implementations, the pre-existing information may be information about which cells are fully observable, partially observable, and unobservable. In some implementations, the pre-existing information may include a shared instance of a virtual experience including multiple players, such that all or some of the cells in the shared instance may be common to multiple players. In some implementations, the pre-existing information may include a set of repeating cached states, such that states for all or part of the simulation may loop until a disturbance interferes with the loop. Block 440 may be followed by block 442.

At block 442, the next cell is updated. For example, the updating at each time step may scan through the grid of available cells, progressively updating the cell based on the defined approaches for updating the velocity field and the density field values in each cell. Block 442 may be followed by block 450.

At block 450, it is determined whether pre-existing information is available for the current cell. In some implementations, such pre-existing information includes one or more of the types of pre-existing information determined at block 440. While certain examples of pre-existing information are specified and explained in this disclosure, these are only examples of pre-existing information. Using pre-existing information of other types to achieve a low computational burden when performing fluid simulations may be part of other implementations. If the pre-existing information is available, block 450 is followed by block 460. If the pre-existing information is not available, block 450 is followed by block 470.

At block 460, a fluid state is recalculated using the pre-existing information. For example, observability information may indicate if a cell may be updated at a precision less than a full precision or not updated. A shared instance may allow multiple instances to consolidate calculation for a given cell or provide private instances if different users deviate from a shared cell. Cached states may allow all or part of a simulation to be obtained from repeating previously performed simulation.

As part of block 460, the pre-existing information is used for each cell to omit or substitute for operations otherwise performed during the recalculating. However, it may be relevant to only omit or substitute for operations that cause a decrease that is less than a threshold value in a numerical metric of a visual quality of the simulation. For example, omitting some operations may not result in a decrease of the visual quality of the simulation or may decrease the visual quality by an amount deemed acceptable.

These approaches generate a fluid state for the cell with a lower computational burden, in that all or part of the computation is already done or can be avoided. In general, the method assumes that at least one cell has pre-existing information in that the method relies on pre-existing information to improve the fluid simulation. Block 460 may be followed by block 480.

At block 470, a fluid state is recalculated without pre-existing information. For example, some of the simulated fluid may not have pre-existing information. In this situation, the fluid state is updated by updating the density field and the velocity field in a grid-based manner. Block 470 may be followed by block 480.

At block 480, it is determined whether the simulation for the cells is complete. That is, it is determined if the velocity field and the density field for each cell in the fluid to be simulated were updated. If the simulation is complete, block 480 is followed by block 490. If the simulation is not complete, block 480 is followed by block 442. That is, if the simulation is not complete, the simulation proceeds to update the next cell at block 442. Accordingly, the updating continues until every cell has been updated, with those cells having pre-existing information using the information to improve the performance of the simulation.

At block 490, an animation is rendered using the generated fluid states. For example, if the fluid being simulated is a fluid in three dimensions, the fluid could be rendered using volume rendering. However, in other implementations, other rendering techniques are also possible, and techniques such as surface rendering are possible.

The animation may be rendered such that as each time step is completed, the next frame of the animation is rendered in real time. It may also be possible to generate all of the frames over a plurality of time steps and then display a plurality of rendered frames in succession. Block 490 may be followed by block 430, in that after rendering occurs, another time step follows (assuming that the simulation continues).

Figure 5A:
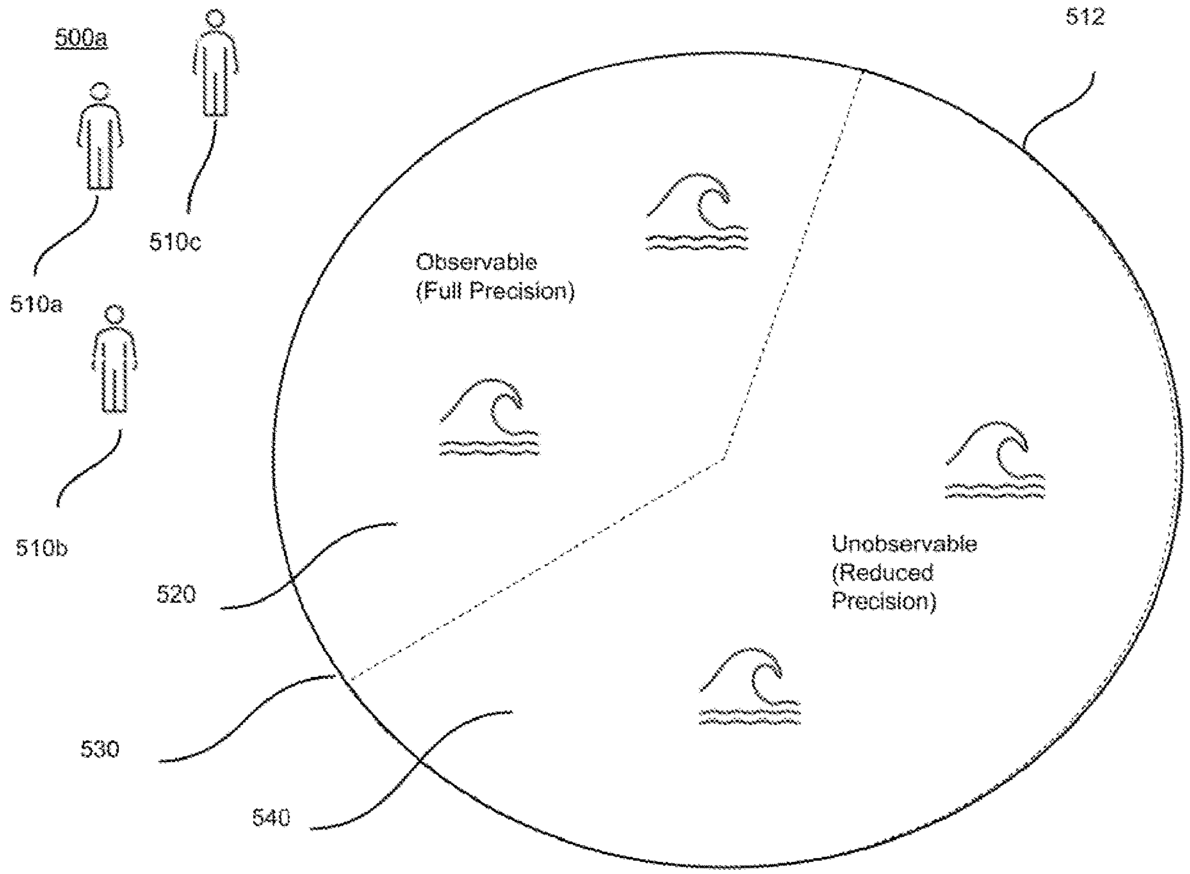
FIG. 5A is a diagram that illustrates performing fluid simulation by dividing cells into observable and unobservable cells, in accordance with some implementations.

FIG. 5A—Dividing Cells into Observable and Unobservable Cells

FIG. 5A is a diagram 500*a* of performing fluid simulation by dividing cells into observable and unobservable cells, in accordance with some implementations. For example, FIG. 5A illustrates a group of avatars, including avatar 510*a*, avatar 510*b*, and avatar 510*c*. These avatars are gathered on one side of a pond 512. The avatars, based on their location and a facing direction, may only be able to see certain portions of a virtual experience. Hence, pond 512 may be divided into regions, including an observable region 520 and an unobservable region 540. The observable region 520 may be divided from the unobservable region 540 by a boundary 530.

In some implementations, the cells in the observable region 520 may be simulated at full precision. In general, full precision as used herein refers to a precision that would be used in rendering a cell without taking steps to change computational complexity. For example, this could include greater floating point precision, or could include using smaller cells or shorter time steps or a more detailed geometric representation. Because these cells are relevant to the players' point of view, it would be inappropriate not to model these cells with full precision or increased accuracy as it could introduce detrimental artifacts.

However, the cells in the unobservable region 540 may be modeled with a precision less than a full precision (for example, less numerical precision, or larger cells or time steps). The cells in the unobservable region 540 could even be omitted from the modeling entirely as they might not have an effect on the simulation that is observable by the users. The boundary 530 may provide a sharp division between observable region 520 and not observable region 540. In such an implementation, each cell is considered as being observable or not observable. Those cells that are observable are updated with full precision. Those cells that are not observable are updated with a precision less than a full precision or are not updated at all.

In some implementations, the division between observable cells and unobservable cells may not be a sharp division boundary 530. For example, there may be observable cells, partially observable cells, and unobservable cells. The observable cells may be rendered with full precision. The partially observable cells may be rendered with a precision less than a full precision. The unobservable cells may be rendered at a still lower precision or may not be rendered at all. Alternatively, there may be a progression of precisions, such that fully observable cells are rendered with full precision, and as cells are less and less observable, they are rendered with progressively less precision.

Additionally, the determination of whether a cell is observable may be based on a number of factors with respect to which avatar(s)' perspective is under consideration. For example, the observable cells 520 may be those cells observable by avatar 510*a*. The observable cells 520 may also include those cells that are observable by a group of avatars, such as avatar 510*a*, avatar 510*b*, and avatar 510*c*. Moreover, different avatars may have different boundaries 530 that separate observable cells 520 from unobservable cells 540.

In some implementations, observable cells 520 that are fully observable by any avatar may be rendered at full precision. Cells that are partially observable or unobservable cells 540 for all or some of the avatars may be rendered at a precision less than a full precision. Generally, it may only be appropriate to omit or use a very low precision when rendering cells that are unobservable cells 540 for a set of avatars who would otherwise see the effects of rendering those cells. In some implementations, observability is associated with a numerical observability score for cells, and the numerical observability score affects how a given cell is rendered.

Figure 5B:
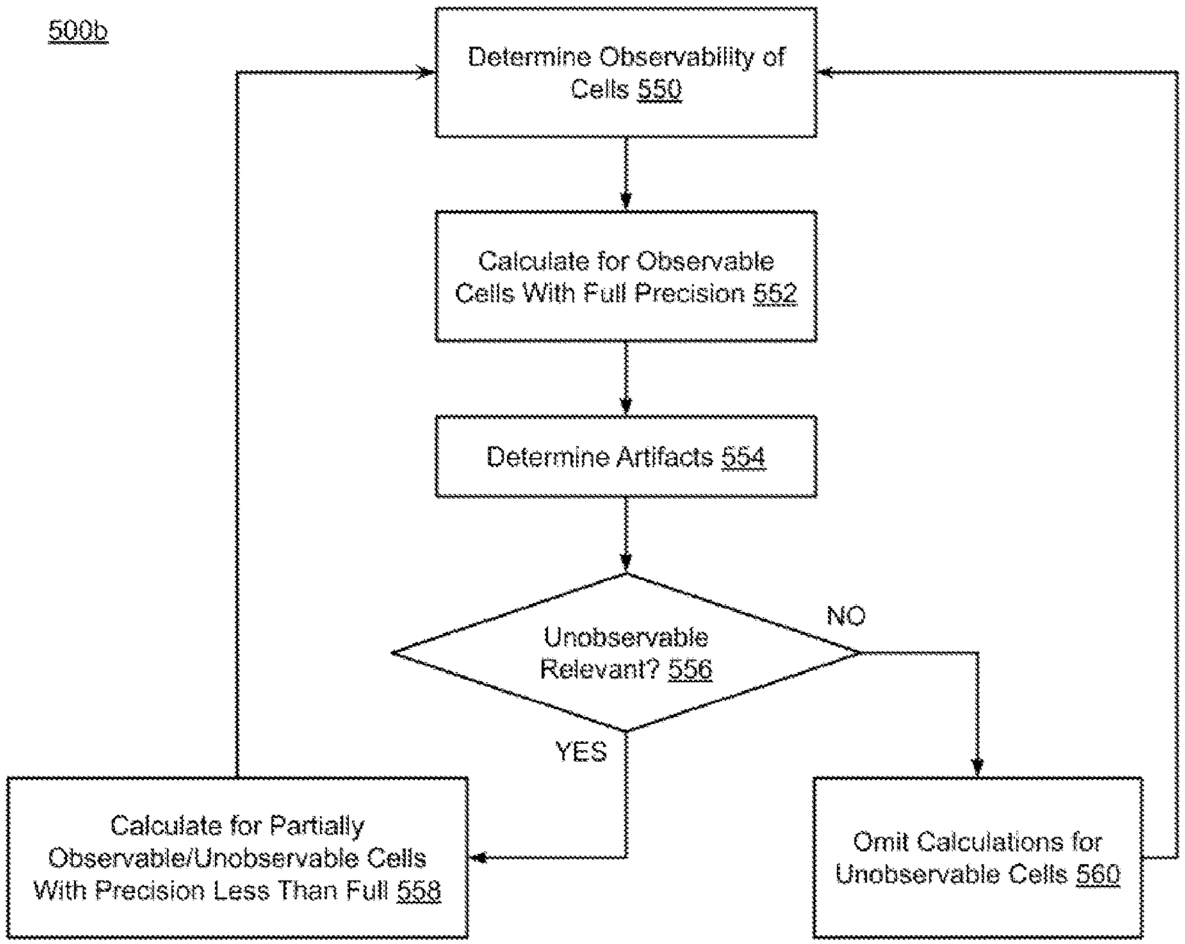
FIG. 5B is a flowchart of a method for performing fluid simulation by dividing cells into observable and unobservable cells, in accordance with some implementations.

FIG. 5B—Method of Dividing Cells into Observable and Unobservable Cells

FIG. 5B is a flowchart of a method 500*b* for performing fluid simulation by dividing cells into observable and unobservable cells, in accordance with some implementations. The method 500*b* may be used to achieve the low computational cost of fluid simulations. In some implementations, method 500*b* can be implemented, for example, on a virtual experience server 102 described with reference to FIG. 1. In some implementations, some or all of the method 500*b* can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 500*b*. In some implementations, different components of one or more servers and/or clients can perform different blocks or other parts of the method 500*b*. In some examples, a first device is described as performing blocks of method 500*b*. Some implementations can have one or more blocks of method 500*b* performed by one or more other devices (e.g., other client devices or server devices) that can send results or data to the first device. Method 500*b* may begin at block 550.

At block 550, cells are determined as being associated with an observability. For example, cells may be determined as being observable or unobservable cells. As noted, in some implementations, such a determination may also include whether cells are partially observable. Thus, cells could be determined as being observable, partially observable, or unobservable. In some implementations, the observability could be represented as a numerical score having a range from totally unobservable to totally observable (for example, a score of 0 to 1, a percentage from 0% to 100, and so on). Block 550 may be followed by block 552.

At block 552, calculation is performed for observable cells with full precision. As noted, observable cells may be cells that are fully observable by at least one avatar. Because the cells are fully observable, these cells may be modeled accurately because otherwise performance would deteriorate. Block 552 may be followed by block 554.

At block 554, it may be optionally determined to what extent artifacts occur in the calculation because the unobservable and partially observable cells have not yet been rendered. At block 554, the simulation has access to the calculations obtained for observable cells. By considering these calculations, it may be possible to see to what extent additional calculations are to be performed to render the simulation with an acceptable level of visual artifacts.

An acceptable level of artifacts may be defined in various ways. The acceptable level of artifacts may include a maximum total quantity of artifacts, a maximum frequency of artifacts for a given volume, a maximum artifact size, a maximum artifact deviation, and so on. For example, block 554 may indicate that simulating certain partially observable cells at a certain precision less than a full precision and simulating certain unobservable cells may provide an acceptable level of artifacts. For example, Block 554 may be followed by block 556.

At block 556, it may be determined whether calculation is to be performed for the unobservable cells. For example, if an acceptable level of artifacts is present without the calculation, additional calculation may not be performed. If it is determined that calculation is to be performed to keep artifacts acceptable, block 556 is followed by block 558 to perform such calculations. If it is determined that calculation is not to be performed, block 556 is followed by block 560.

At block 558, calculation may be performed for unobservable cells with a precision lower than full precision. At block 556, it was previously determined that the recalculation must be based, at least partially on partially observable or unobservable cells. Hence, at block 558, calculation occurs with a precision less than a full precision. There may be different precision levels associated with partially observable cells and unobservable cells.

In some implementations, cells have an observability score and the precision level corresponds to the observability score. Thus, as cells other than fully observable cells become less and less observable, fewer and fewer resources are used to render these cells, such that the fluid simulation still only includes artifacts that do not exceed a threshold. Block 558 may be followed by block 550, at which point the determination of observable and unobservable cells begins again.

At block 560, calculation may be omitted for unobservable cells. Thus, rather than performing an update on unobservable cells, their velocity field and density field values may be left unchanged. Unobservable cells may include unobservable cells that are fully unobservable for certain avatar(s). It may also be possible to omit calculation here for cells that are partially observable, if omitting such calculations does not cause unacceptable artifacts, either in the fully observable cells or the partially observable cells.

If there are artifacts in the unobservable cells, this is generally not an issue as the artifacts may not be observable in these cells. Block 560 may be followed by block 550, at which point the determination of observability of cells begins again. By determining ways to use a low precision or omit calculations, it may achieve a low computational burden when simulating a fluid's behavior.

Figure 6A:
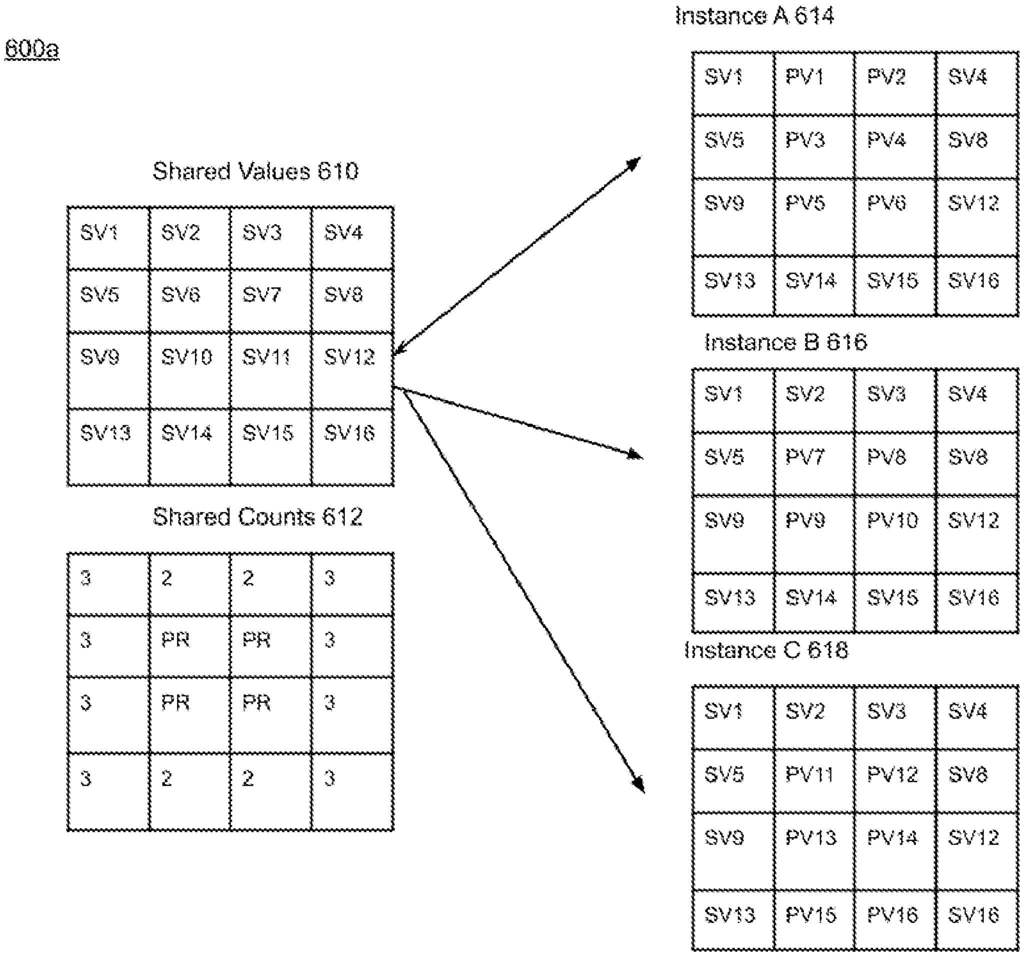
FIG. 6A is a diagram of using shared values in a fluid simulation to allow low computational costs, in accordance with some implementations.

FIG. 6A—Using Shared Values in a Fluid Simulation

FIG. 6A is a diagram 600*a* of using shared values in a fluid simulation to allow low computational costs, in accordance with some implementations. FIG. 6A illustrates an example of a grid of cells in a fluid to be rendered. FIG. 6A illustrates a two-dimensional (2D) grid of cells for fluid simulation for purposes of illustration. It may be realized that the principles presented in FIG. 6A may be applied in a corresponding manner in the context of a three-dimensional (3D) set of cubic cells.

FIG. 6A illustrates a grid of shared values 610 and a grid of shared counts 612. FIG. 6A illustrates an approach in which it is possible to avoid computations by having a shared instance that eliminates the burden for individual instances to each have private information. For example, multiple users may be present in multiple instances of the same simulation. Thus, there may be N copies of the same virtual world, with different players in each. In this case, parts of the fluid computation are sometimes redundant and may be reused across instances. For example, there may be three conceptual levels used to organize simulations in a virtual environment. There may be specific experiences (for example, a particular game or level in a virtual environment), instances (for example, an instance may be a particular copy of an experience that is currently running), and there may be multiple players in a particular instance. Thus, a group of players may all participate in an instance of an experience.

For example, the shared values 610 and shared counts 612 may provide a shared set of values. These values may be values for a shared, single copy of the fluid simulation. They may be used for all or some of the instances. These shared values may be shared by a plurality of players who interact in the same virtual experience. For example, there may be instance A 614 for a first player, instance B 616 for a second player, and instance C 618 for a third player. However, the shared instance may also involve providing private values for certain cells, at locations where a given cell differs from the values in the shared copy.

Instance A 614 shares the values of shared values 610 (including SV1 through SV16), with the exception of private values PV1, PV2, PV3, PV4, PV5, and PV6 as illustrated in FIG. 6A. Instance B 616 shares the values of shared values 610, with the exception of private values PV7, PV8, PV9, and PV10 as illustrated in FIG. 6A. Instance C 618 shares the values of shared values 610, with the exception of private values PV11, PV12, PV13, PV14, PV15, and PV16.

Thus, each instance of instance A 614, instance B 616, and instance C 618 corresponds to shared values in the shared instance at the same location, except for values that are specifically marked as being private. Hence, because only a small subset of the values in each private instance are private, the computations for the shared instance can be reused for other values, providing a low overall computational burden by avoiding redundancy.

Hence, shared counts 612 shows how many private instances use the values from shared values 610. Tracking shared counts 612 may be helpful because it helps manage how to transition between sharing values in the shared instance or generating a shared copy. For example, SV1, SV5, SV9, SV13, SV4, SV8, SV12, and SV16 are each shared 3 times as instance A 614, instance B 616, and instance C 618 share these shared values in their respective simulations. SV2, SV3, SV14, and SV15 are each shared 2 times in that SV2 and SV3 are shared by both instance B 616 and instance C 618, while SV14 and SV15 are each shared by instance A 614 and instance B 616.

However, SV6, SV7, SV10, and SV11 are marked at shared counts 612 as each being PR, which indicates that the values at these positions are private. For example, instance A 614 includes PV3, PV4, PV5, and PV6 at these positions, instance B 616 includes PV3, PV4, PV5, and PV6 at these positions, and instance C 618 includes PV3, PV4, PV5, and PV6 at these positions.

In order to manage transitions between shared values and private values, when a user disrupts an individual instance at a location, that instance is made private at that location and other instances are modified appropriately at that location. Furthermore, the private values are periodically compared to the shared instance, and if the private values are close to the shared instance, they are converted back to shared values.

The example of FIG. 6A assumes that there can only be a single shared instance. Technically, the method could be generalized even more. For instance, say there are four experiences, each with a single player-Alice, Bob, Charlie, and Doris. Suppose at t=10, Alice throws a bomb into the lake and the explosion splashes a third of the water out. This causes her instance to separate from the shared instance where all the water is still there. Now suppose at t=20 Bob throws the same kind of bomb into the shared lake, causing Bob's instance to separate as well. However, because the splash is the same, Bob will eventually be left with a lake that is ⅔ full, just like Alice—and this could become apparent if hashes of states are calculated for respective players. The result would be one (full) lake that is shared between Charlie and Doris and another (⅔ full) lake that is shared between Alice and Bob. Thus, in some implementations the approaches discussed may be generalized so that instead of one shared instance along with multiple private instances, there may be multiple shared instances each shared by a subset of the players.

Figure 6B:
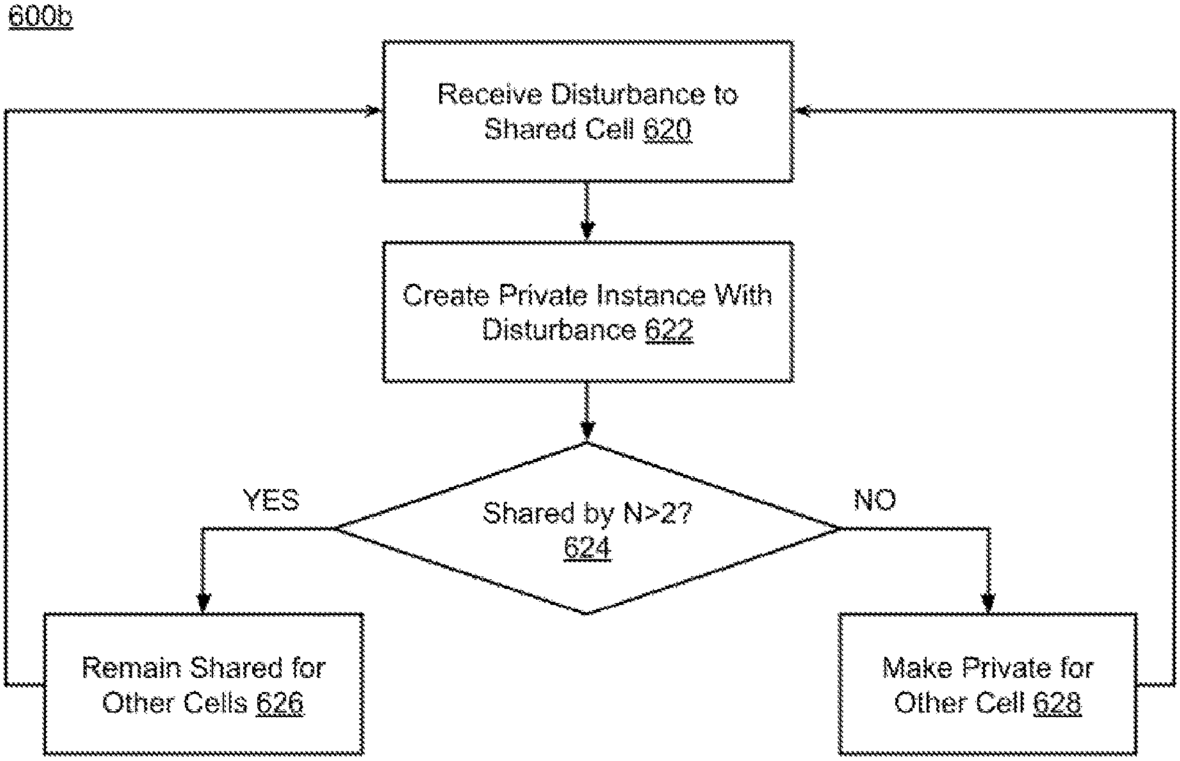
FIG. 6B is a flowchart of a method for using shared values in a fluid simulation, in accordance with some implementations.

FIG. 6B—Method of Using Shared Values in a Fluid Simulation

FIG. 6B is a flowchart of a method 600*b* for using shared values in a fluid simulation, in accordance with some implementations. Further, the method 600*b* may be used to achieve a low computational cost when performing fluid simulations. In some implementations, method 600*b* can be implemented, for example, on a virtual experience server 102 described with reference to FIG. 1. In some implementations, some or all of the method 600*b* can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 600*b*. In some implementations, different components of one or more servers and/or clients can perform different blocks or other parts of the method 600*b*. In some examples, a first device is described as performing blocks of method 600*b*. Some implementations can have one or more blocks of method 600*b* performed by one or more other devices (e.g., other client devices or server devices) that can send results or data to the first device. Method 600*b* may begin at block 620.

At block 620, a disturbance is received at a shared cell. For example, a predefined emitter may act on the shared cell or a user may apply an external force. Such a force occurs in one user's instance. It may be helpful to differentiate that user's instance by converting the location to a private instance. Block 620 may be followed by block 622.

At block 622, a private instance with the disturbance is created. For example, the outside influence is applied to the relevant location in that user's instance. This instance is a private instance in that the outside influence does not necessarily affect other users' instances. Other methods may be used to determine if the disturbance affects other shared cells. However, additional operations may follow that establish how the cell may remain shared for other instances at that location. Block 622 may be followed by block 624.

At block 624, it is determined whether the original shared cell was shared by a number N of cells that is greater than two. That is, it is determined whether the original shared cell was only shared by a total of two cells, or if there would still be multiple instances using the shared value even after creating the private instance due to the disturbance. If N>2, block 624 is followed by block 626. Otherwise (where N=2), block 624 is followed by block 628.

At block 626, the shared cell remains shared for the other cells. For example, prior to the disturbance, there were at least three cells sharing the shared cell. Accordingly, if one cell becomes private, there may still be at least two cells sharing the shared cell. Accordingly, the shared cell remains shared after block 626 by other players' instances. However, the number of cells sharing the cell decreases by one.

For example, if five cells previously shared the shared cell, the cell that receives a disturbance becomes associated with a private cell, and the others may continue to share the cell. However, the count of sharing cells decreases to four, as one of the original five cells no longer shares the cell and is associated with a private instance. Block 626 may be followed by block 620, at which another disturbance is detected, allowing another cycle of updates.

At block 628, the shared cell is also made private for the other cell. For example, prior to the disturbance, there were two cells sharing the shared cell. Accordingly, if one cell becomes private, there is only one cell that still shares the previously shared cell. Thus, the other cell also has a private instance and the cell is no longer shared. Instead of indicating a count of cells that share the shared cell, the counts indicate that every cell has a private instance at that location and hence no cells share the cell. Block 628 may be followed by block 620, at which another disturbance is detected, allowing another cycle of updates.

Figure 6C:
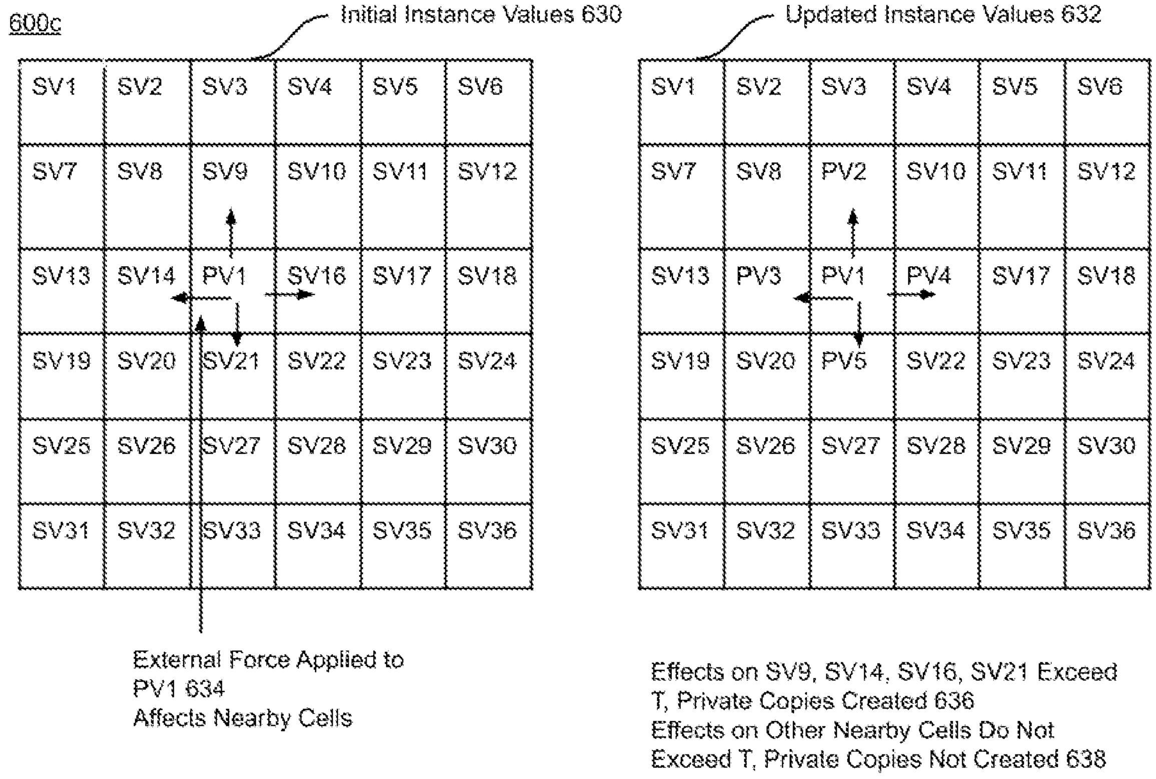
FIG. 6C is a diagram of propagating shared values in a fluid simulation, in accordance with some implementations.

FIG. 6C—Propagating Shared Values in a Fluid Simulation

FIG. 6C is a diagram 600*c* of propagating shared values in a fluid simulation, in accordance with some implementations. For example, FIG. 6C illustrates a grid of initial instance values 630. The grid includes 36 locations, where each location includes shared information (SV1 through SV36) except for a private value PV1 at a location in the central portion of the grid (the third cell column, the third row).

As illustrated in FIG. 6C, an external force 634 is applied to the location of PV1. The external force 634 could be, for example, due to a preexisting emitter or due to a user's action. FIG. 6C illustrates how it is determined how the external force applied to the location of PV1 affects the neighboring cells. FIG. 6C illustrates how the force propagates out to neighboring cells. Based on such propagation, it may be determined how many cells other than the specific cell at which a disturbance or external force is applied may be converted into private cells to take into account the effects of the applied force.

For example, the simulation extends the external force 634 to determine the effects on immediately adjacent cells (SV9, SV14, SV16, and SV21). The effects may exceed a threshold. For example, the external force 634 may change the velocity field or the density field at these immediately adjacent cells and compare the velocity field and the density field changes to corresponding thresholds.

The simulation may continue to extend the external force 634 to more distant cells, such as (SV8, SV10, SV20, SV22) or even more distant cells, such as (SV3, SV13, SV17, SV27), and so on, extending the external force 634 progressively further and further and modifying the velocity field and the density field for these cells accordingly. However, the effects of the external force 634 are "diluted" with distance. Additionally, other properties and/or characteristics of cells may affect how an external force 634 attenuates and propagates.

For example, FIG. 6C illustrates a grid of updated instance values 632. In the grid of updated instance values, SV9 is replaced by PV2, SV14 is replaced by PV3, SV16 is replaced by PV4, and SV21 is replaced by PV5. Accordingly, an operation occurs in which the propagated effects of the external force 634 applied at PV1 have effects on SV9, SV14, SV16, and SV21 that exceed a threshold value T.

For example, the threshold may include a threshold change to the associated velocity field, a threshold change to the associated density field, or a threshold change that considers a change to both the velocity field and the density field. For example, the external force 634 applied at PV1 has effects on the density field values for SV9, SV14, SV16, and SV21 that each exceed a threshold value T. Because these effects exceed T, private copies 636 of these cells are created. However, if effects on a cell are less than T (as described), the cells remain shared. Hence, for the other cells, private copies are not created 638.

As illustrated in FIG. 6C, the shared values other than SV9, SV14, SV16, and SV21 remain shared. These values remain shared because the effects of external force 634 are not sufficient to cause creating private copies. Once the external force 634 has been propagated, further propagation is not performed because the initial propagation already has established whether cells in the grid have a sufficient effect (that exceeds T) that would involve setting up private values for those cells.

However, an external force 634 may affect multiple initial cells simultaneously. In such a case, the external force 634 may be propagated for one cell at which the external force 634 is applied at a time. Alternatively, the external force 634 for each cell may be propagated at an initial distance, and once each cell's effects are propagated at that distance, the propagation occurs at a further distance. Thus, these approaches may be characterized as being similar to a depth-first approach (propagate each cell until done, then proceed to the next cell) or a breadth-first approach (gradually extending propagation for each cell in turn).

As noted, FIG. 6C illustrates a grid of initial instance values 630 and a grid of updated instance values 632. While these grids are presented in a two-dimensional (2D) form for ease of explanation, it may be recognized that the techniques presented herein may be implemented in a three-dimensional (3D) context. Hence, FIG. 6C shows how disturbances may be propagated throughout a fluid simulation as described herein.

Figure 6D:
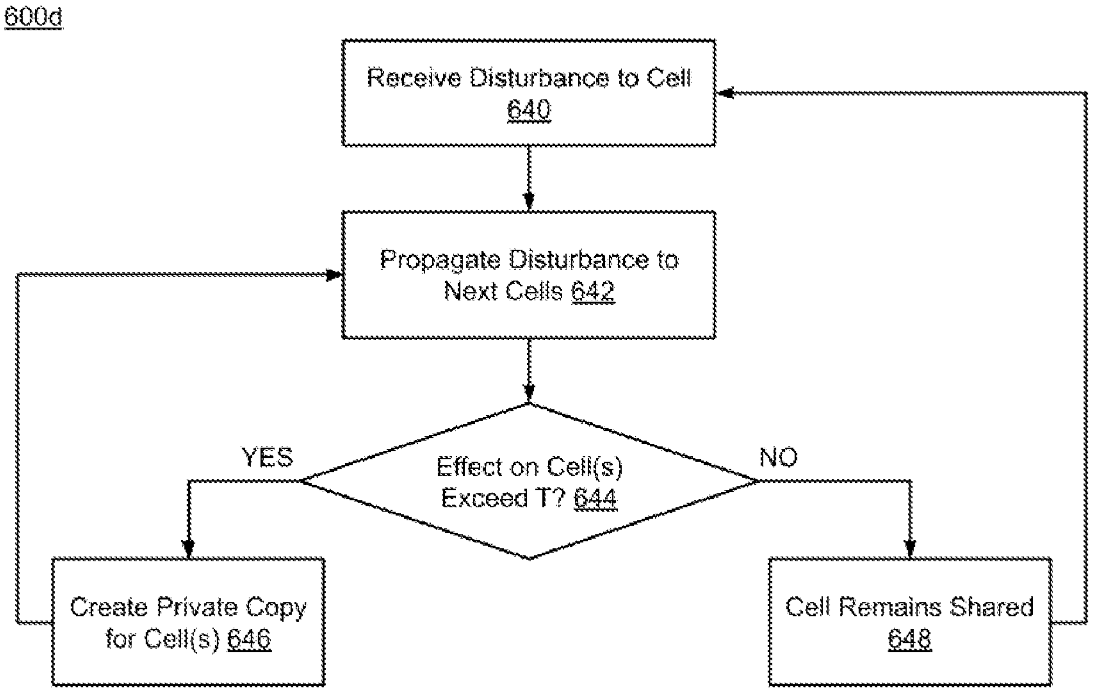
FIG. 6D is a flowchart of a method for propagating shared values in a fluid simulation, in accordance with some implementations.

FIG. 6D—Method of Propagating Shared Values in a Fluid Simulation

FIG. 6D is a flowchart of a method 600*d* for propagating shared values in a fluid simulation, in accordance with some implementations. Further, the method 600*d* may be used to achieve a low computational cost when performing fluid simulations by propagating disturbances to shared cells, thereby ensuring appropriate results when managing shared cells. In some implementations, method 600*d* can be implemented, for example, on a virtual experience server 102 described with reference to FIG. 1. In some implementations, some or all of the method 600*d* can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 600*d*. In some implementations, different components of one or more servers and/or clients can perform different blocks or other parts of the method 600*d*. In some examples, a first device is described as performing blocks of method 600*d*. Some implementations can have one or more blocks of method 600*d* performed by one or more other devices (e.g., other client devices or server devices) that can send results or data to the first device. Method 600*d* may begin at block 640.

At block 640, a disturbance is received to a cell, such as an external force such as a predefined emitter or a user interaction. The disturbance affects the cell at which the disturbance is applied by changing its subsequent velocity field values and subsequent density field values. However, the disturbance may affect other cells. Block 640 may be followed by block 642, which implements these effects.

At block 642, the disturbance is propagated to neighbors of the affected cell. For example, block 642 takes the disturbance applied at block 640 and ascertains how the disturbance affects neighboring cells, in terms of their velocity field values and density field values. As the disturbance gets farther away from the point of application, the disturbance "dilutes" or attenuates in intensity.

Block 642 may be a way to progressively extend the disturbance to see how the disturbance affects surrounding cells. An aspect of such propagation is that once the effects are sufficiently small, the propagation may be complete, in that the use of shared cells may essentially ignore effects of disturbances that are sufficiently small and/or attenuated in a way that it is not relevant to cause a cell to become a private cell. Block 642 may be followed by block 644.

At block 644, it is determined whether the effect of the disturbance on a given cell exceeds a threshold T. For example, the disturbance may have an effect on the velocity field or the density field for a cell. If the velocity field value for the cell changes by an amount exceeding the threshold or the density field for the cell changes by an amount exceeding the threshold, or if both fields change in a way satisfying a criterion, block 644 is followed by block 646. Otherwise, block 644 is followed by block 648.

At block 646, a private copy for the cell is created. In this situation, it has been determined that the disturbance has enough of an effect (that is, has an effect exceeding a threshold) on the cell's velocity field and/or density field that the disturbance has a significant effect on that cell as well. Thus, in order to preserve the integrity of the simulation, the effect may be propagated to that cell. Block 646 may be followed by block 642, at which the disturbance is further propagated, continuing the propagation.

At block 648, the cell remains shared. In this situation, the effect of the disturbance is not sufficient to justify causing the cell to take on a private instance. Block 648 may be followed by block 640, at which another disturbance is received and propagated, continuing the simulation. Hence, at this point the disturbance no longer propagates further and the remaining cells may remain shared, increasing computational efficiency.

Figure 6E:
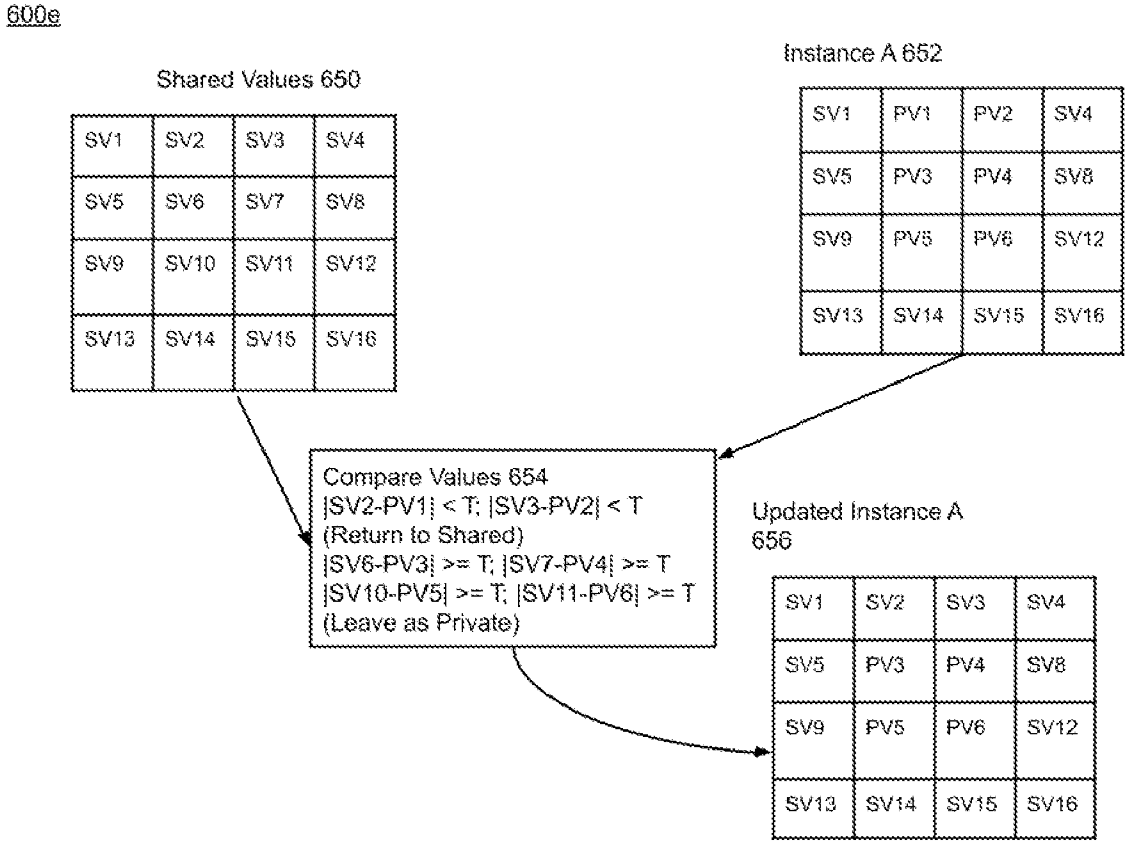
FIG. 6E is a diagram of converting private values to shared values in a fluid simulation, in accordance with some implementations.

FIG. 6E—Converting Private Values to Shared Values in a Fluid Simulation

FIG. 6E is a diagram 600*e* of converting private values to shared values in a fluid simulation, in accordance with some implementations. FIG. 6E illustrates a grid of shared values 650 and a grid for instance A 652. At various points in time, it may be helpful to compare the corresponding values between the grid of shared values 650 and the grid for instance A 652. For example, the values at the same locations in the grid may be compared.

This comparison may be relevant because it may be important to return private cells to a shared state, if such returning can be done without adversely affecting the quality of the simulation. Hence, if the private instance values are close enough to the shared values, the private instance values may be returned to being shared values. However, it is only relevant to compare the shared values from 650 with the private values from instance A 652. Those values that are already shared involve no additional actions, in that instance A 652 is already using them.

Thus, in FIG. 6E, there is a comparison of values 654. The comparison of values 654 establishes that the difference between SV2 and PV1 (|SV2−PV1|)<T and between SV3-PV2 (|SV3−PV2)<T. Such a comparison may provide that the difference for the velocity field values and the difference for the density field values are each less than a respective threshold. For example, even if the velocity field values are close, it may be inappropriate to return a private cell to be shared if the density field values are quite different (and vice versa). However, in some implementations, the criteria for returning a private cell to being shared takes into account various aspects of the velocity field and the density field. Accordingly, these cells may be restored to being shared.

However, other private values may be too different to be restored to being shared. Thus, in the comparison of values 654, (|SV6−PV3|)>=T, (|SV7−PV4|)>=T, (|SV10−PV5|)>=T, (|SV11−PV6|)>=T, and hence PV3, PV4, PV5, and PV6 are left as private cells in updated instance A 656.

By periodically checking which private cells are close enough as defined by a threshold to corresponding shared cells in value, certain private cells may be reintegrated into the shared instances. Such reintegration helps achieve the computational advantages of sharing cells which would otherwise naturally vanish over time. Otherwise, shared cells would progressively be replaced by private cells without a mechanism to restore the private cells to a shared state. The advantage of sharing cells would hence otherwise disappear over time.

Figure 6F:
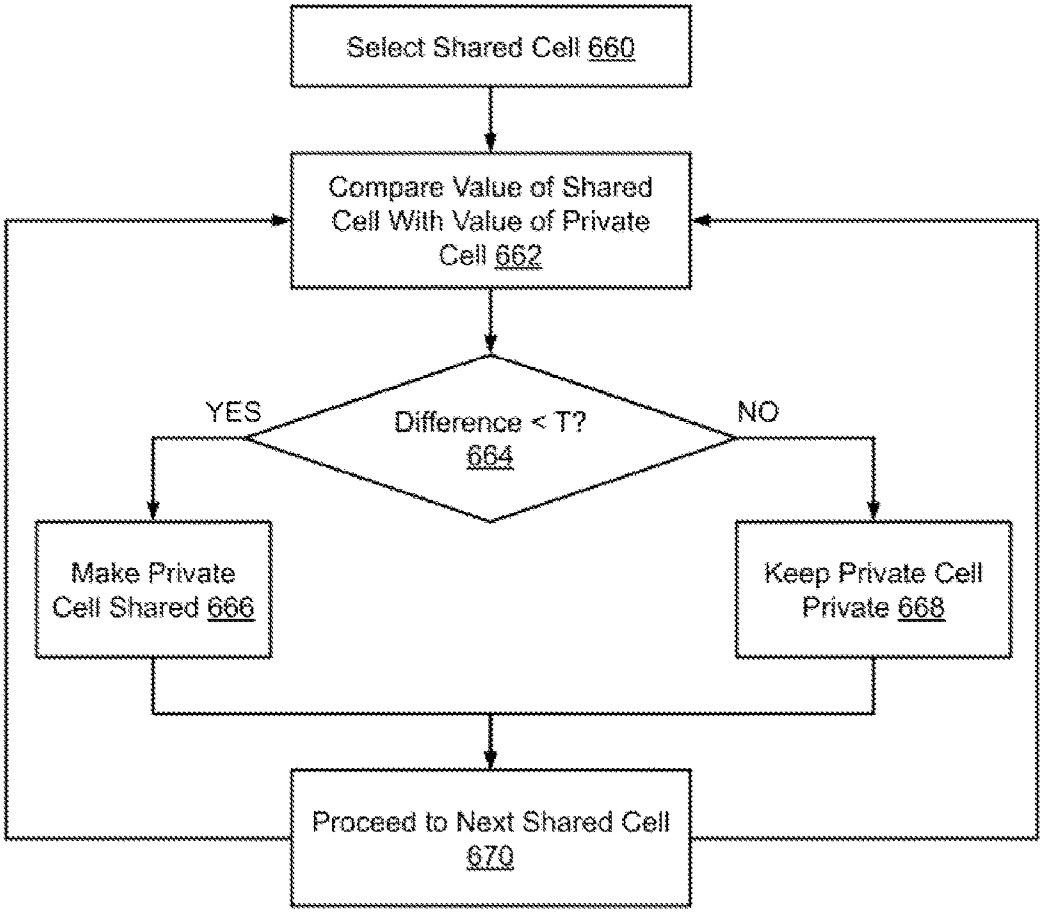
FIG. 6F is a flowchart of a method for converting private values to shared values in a fluid simulation, in accordance with some implementations.

FIG. 6F—Method of Converting Private Values to Shared Values in A Fluid Simulation FIG. 6F is a flowchart of a method 600f for converting private values to shared values in a fluid simulation, in accordance with some implementations. Further, the method 600f may be used to achieve a low computational cost when performing fluid simulations. In some implementations, method 600f can be implemented, for example, on a virtual experience server 102 described with reference to FIG. 1. In some implementations, some or all of the method 600f can be implemented on one or more client devices 110 as shown in FIG. 1, on one or more developer devices 130, or on one or more server device(s) 102, and/or on a combination of developer device(s), server device(s), and client device(s). In described examples, the implementing system includes one or more digital processors or processing circuitry ("processors"), and one or more storage devices (e.g., a data store 120 or other storage).

In some implementations, special processors, e.g., physics processors, vector processors, graphics processors, etc. may be utilized to implement one or more of method 600f. In some implementations, different components of one or more servers and/or clients can perform different blocks or other parts of the method 600f. In some examples, a first device is described as performing blocks of method 600f. Some implementations can have one or more blocks of method 600f performed by one or more other devices (e.g., other client devices or server devices) that can send results or data to the first device. Method 600f may begin at block 660.

At block 660, a shared cell is selected for comparison with a private cell in a given instance. For example, method 600f may be carried out in at least two related ways. In some implementations, method 600f compares corresponding cells at corresponding locations in the fluid simulation, by comparing each cell in the shared instance with each cell in a corresponding user's instance. In one approach, the comparison includes comparing each of the cells in an instance with corresponding shared cells, one instance at a time. In another approach, the comparison includes comparing each of the cells at a given location across multiple instances, one location at a time.

At block 662, for each private cell in the simulation, a value of a corresponding shared cell may be compared with a value of the private cell. Specifically, values for a velocity field and for a density field may be compared between a private cell for an instance and a corresponding cell. The comparison may provide that the velocity field and the density field values for the cells being compared are compared with one another or may satisfy other conditions. Block 662 may be followed by block 664.

At block 664, it is determined whether the differences determined in block 662 are less than a threshold value T (such as respective differences for the corresponding velocity field and density field values). If so, block 664 is followed by block 666. If not, block 664 is followed by block 668.

At block 666, the cell that was previously private is made shared. The simulation has established that the private values in the cell (of the cell's velocity field and density field) are close to the shared value in the corresponding cell. Accordingly, it is possible to restore the private cell at a given location to its association with the shared value without causing too much deviation from the shared value. By doing so, the efficiency gains from using a shared instance may be captured over time. Block 666 may be followed by block 670.

At block 668, the private cell is kept private. Because the private cell has a value that is significantly different from the corresponding shared value (with respect to at least one of the velocity field and the density field), it is appropriate to leave the private cell as private rather than returning the private cell to a shared state. Block 668 may be followed by block 670.

At block 670, a next shared cell is considered. Once the next shared cell is considered at block 670, block 670 is followed by block 662, at which point the private cells' values are compared again with the values of the next shared cell.

Hence, FIG. 6F shows how a mechanism works that ascertains at each timestep which private cells are sufficiently close to corresponding shared cells that the private cells may be returned to a shared state. Such action is included because otherwise, as cells change from a shared state to a private state, progressively more and more cells would become private.

Without a mechanism to return cells to a shared state, eventually all of the cells would become private. This situation could become difficult in that the advantage of using the shared cells is achieved by maximizing shared cells as an alternative to private cells. If progressively more and more cells become private, that would negate this advantage without a mechanism to return cells from a private state to a shared state.

Figure 7:
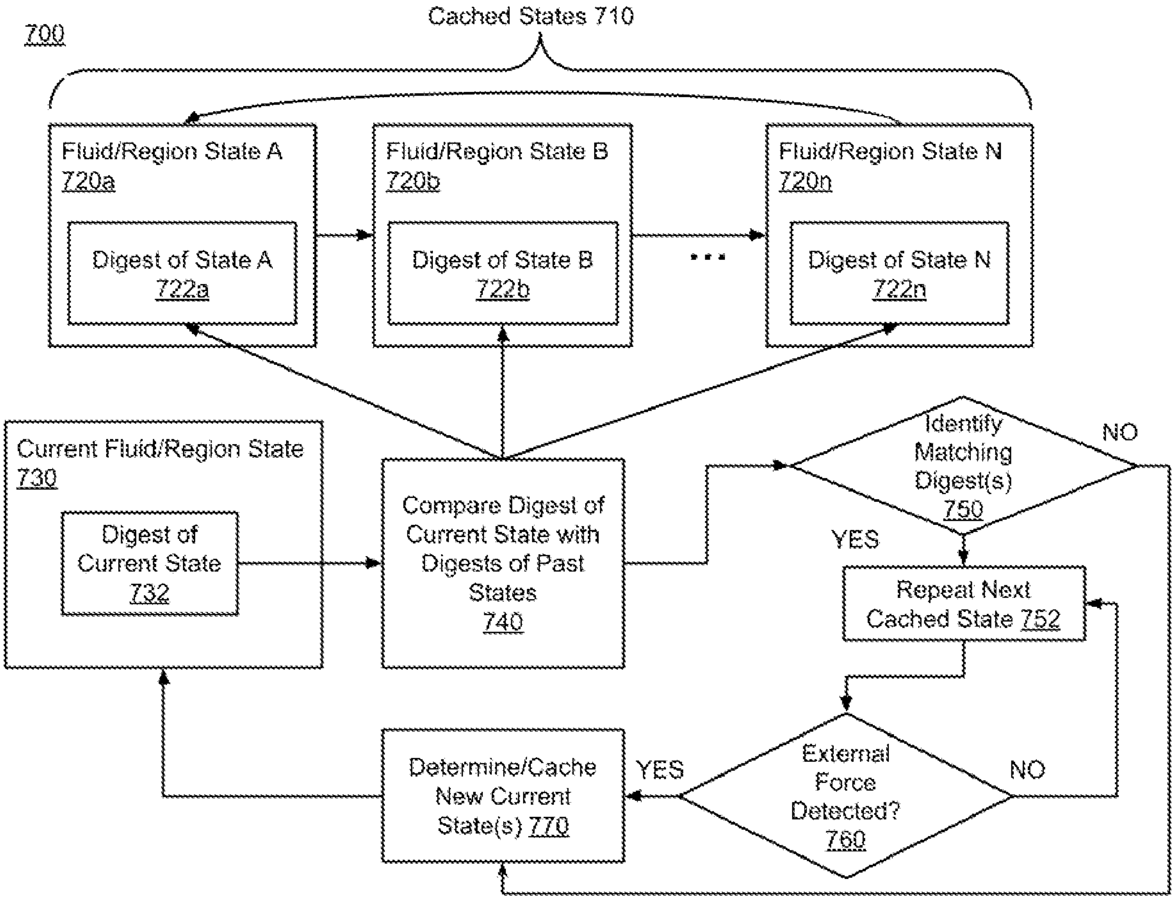
FIG. 7 is a diagram of using cached states in a fluid simulation to achieve low computational costs, in accordance with some implementations.

FIG. 7—Using Cached States in a Fluid Simulation

FIG. 7 is a diagram 700 of using cached states in a fluid simulation to achieve low computational costs, in accordance with some implementations. For example, in FIG. 7, there may be a series of cached states 710. For example, there may be n cached states, such as fluid/region state A 720a, fluid/region state B 720b, through fluid/region state N 720n. Each state may include information about cells in the region at a point in time, such as their associated velocity field and density field values. The states may be associated with the entirety of a fluid but may also model a sub-region as discussed below. States may also be associated with information detailing any external forces that affected the simulation at those states.

Each of these fluid/region states may be associated with a corresponding digest, such as digest of state A 722a, digest of state B 722b, through digest of state N 722n. Here, a digest refers to a summary or fingerprint of the state, which allows implementations to identify when different states match. For example, a digest could be a hash value associated with taking a fluid/region state and finding a matching hash value that summarizes the velocity field and density field values (and any other relevant information describing the fluid/region at a point in time) in a way that facilitates comparing a current state of the simulation with past cached states 710.

However, the digest need not be an "exact" hash. For instance, for hashing purposes some implementations could clip all the values used to a certain precision. Accordingly, a small difference (for example, a difference less than a threshold difference) in some of the cell(s) does not cause the whole hash to be different. Thus, digests may involve a small amount of approximation, such that digests represent an overview of a given state for comparison purposes.

For example, FIG. 7 illustrates a current fluid/region state 730. Current fluid/region state 730 is associated with a digest of the current state 732. As noted, such a digest is a summary of the data in the state, such as a hash value, that allows for a quick comparison of state information without immediately requiring a full comparison of every piece of information in the state (though a full comparison may optionally be performed once an initial match has been identified).

The digest of the current state 732 may be compared with digests of past states 740. For example, these digests may include state A 722a, digest of state B 722b, through digest of state N 722n. By comparing these digests, it is possible to establish if the current state is the same (or highly similar to) a previous state (from among the cached states).

The comparison 740 may be followed by identifying matching digest(s) at 750. In some implementations, digests are considered to be matching if they are identical or if any differences between the digests do not exceed a threshold value. If matching digests are identified, such that the current fluid/region state 730 is similar to at least one cached state 710, the identifying is followed by block 752 to utilize the cached state(s). If matching digests are not identified, the identifying is followed by block 770, to continue the simulation without being able to utilize cached state(s).

At block 752, the next cached state is repeated. For example, block 752 initially repeats the matching cache state, or a subsequent cached state as the simulation progresses. Block 752 is followed by block 760. At block 760, it is determined if an external force is detected. If so, block 760 is followed by block 770. If not, block 760 is followed by block 752 again.

Basically, this loop captures that once it is established that a current state corresponds to one of the cached states 710, it is possible to loop through the cached states 710 until a disturbance occurs that would cause a deviation from the cached states. Looping through the cached states 710 is possible because the simulation is deterministic. That is, until a disturbance causes a deviation from the previously cached sequence of states, the same sequence of states may repeat.

For example, if digest of current state 732 matches digest of state B 722b, fluid/region state B 720b may be used to avoid calculating further states for a period of time in that in some implementations, it may be possible to loop through states by using fluid/region state B 720b, followed by subsequent cached states 710 up until fluid/region state N 720n, then repeating fluid/region state A 720a through fluid/region state N 720n in a repeating loop until an event that causes a deviation from looping.

For example, there may be a situation in which a steady wind blows across a lake from the same direction. Eventually, this causes a repeating pattern. It may be possible to avoid computing the pattern over and over. Until there is a change in the wind or user intervention (such as throwing a stone into the lake), the wind causes the lake to follow a sequence of states in a way that adequately models the lake, but without repeatedly performing the calculations.

At block 770, new current states are determined and cached. Block 770 may be followed by reconsidering the current fluid/region state 730. After block 770, the current fluid/region state 730 has been updated to reflect the effects of the new disturbance.

While the discussion of cached states 710 and their comparison to current fluid/region state 730 may correspond to an entire fluid being modeled, the state may also pertain to a region of the fluid. For example, while the cached states 710 may model an entire lake being affected by wind, it may also be possible to use the cached states 710 to model a portion of the lake. For example, the fluid/region state 730 may model a portion of the lake that includes repeating states using cached states 710 but may separately model another portion of a lake that includes a disturbance that deviates from the cached states.

Suppose that a steady wind is blowing across a lake and a player throws a rock into one end of the lake. While a naive implementation would not use cached states because part of the lake is disrupted, it may be possible to separately model the other end of the lake which is unaffected or minimally affected by the rock and use cached states to model that part of the lake.

Repeating cached states uses a digest to quickly identify if states for a region or a portion of a region are repeating. If such repetition is detected, it may be possible to loop through the cached states for a region or a portion of a region, until something new occurs, at which point new states are generated and cached. Once another repeating pattern occurs, the next repeating pattern may also be identified and implemented.

Hence, it may be possible to use pre-existing information to allow for a low computational cost when simulating a fluid in a virtual experience. Such a low computational cost is reduced with respect to a computational cost that would otherwise be involved in simulating the fluid. By determining observability of various cells in a fluid, it may be possible to perform calculations for cells at a precision less than a full precision or even avoid calculations entirely. If multiple players participate in a virtual experience, it may be possible to share all or part of the information describing a fluid in the virtual experience when calculating cell information. The sharing also includes features to manage private cell information and successfully ensure acceptable simulation quality while performing the sharing. Also, if certain fluid states repeat in all or part of a simulated fluid, using cached states may allow for repeating these states rather than performing calculations over and over. Using pre-existing information as in these non-limiting examples obviates the performance of certain simulation operations. Hence, computational costs for simulating a fluid are reduced from what the computational costs would be without the techniques. In some implementations, these techniques may be implemented individually or in combination.

Figure 8:
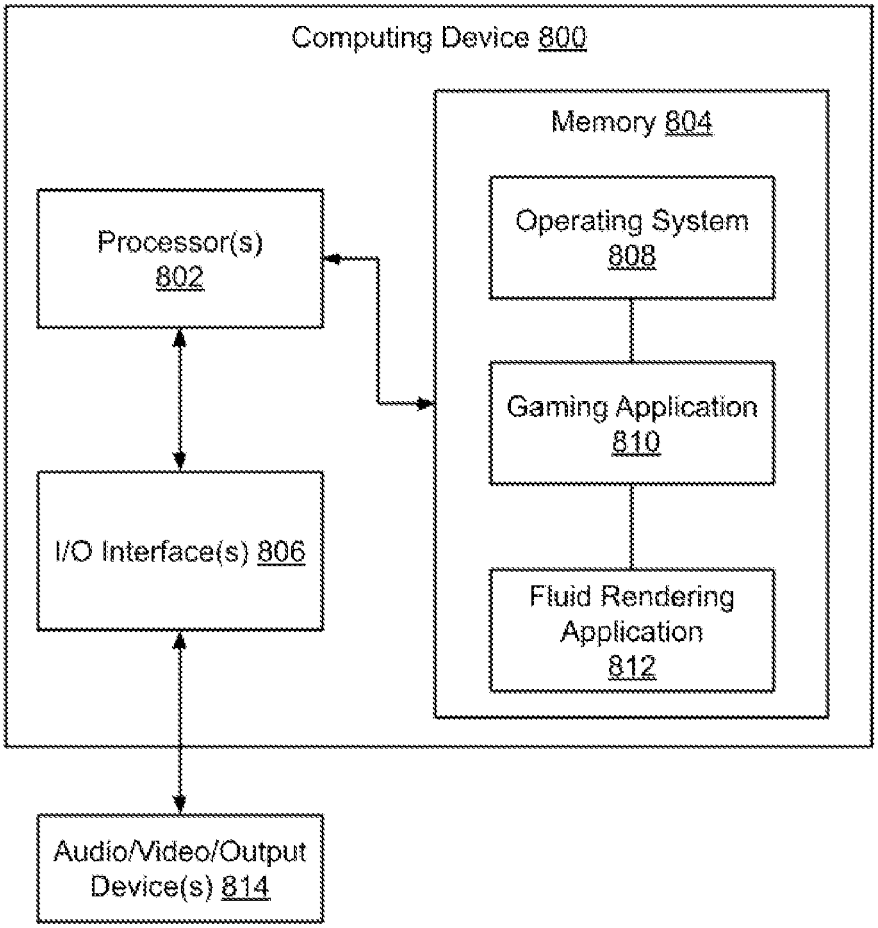
FIG. 8 is a block diagram that illustrates an example computing device, in accordance with some implementations.

FIG. 8—System Architecture

FIG. 8 is a block diagram that illustrates an example computing device, in accordance with some implementations.

FIG. 8 is a block diagram of an example computing device 800 which may be used to implement one or more features described herein. In one example, device 800 may be used to implement a computer device (e.g. 102 and/or 110 of FIG. 1), and perform appropriate method implementations described herein. Computing device 800 can be any suitable computer system, server, or other electronic or hardware device. For example, the computing device 800 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 800 includes a processor 802, a memory 804, input/output (I/O) interface 806, and audio/video input/output devices 814.

Processor 802 can be one or more processors and/or processing circuits to execute program code and control basic operations of the device 800. A "processor" includes any suitable hardware and/or software system, mechanism or component that processes data, signals or other information. A processor may include a system with a general-purpose central processing unit (CPU), multiple processing units, dedicated circuitry for achieving functionality, or other systems. Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 804 is typically provided in device 800 for access by the processor 802, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 802 and/or integrated therewith. Memory 804 can store software operating on the server device 800 by the processor 802, including an operating system 808, one or more gaming applications 810, e.g., a fluid rendering application 812. In some implementations, gaming application 810 can include instructions that enable processor 802 to perform the functions (or control the functions of) described herein, e.g., some or all of the methods described with respect to FIGS. 3A-3C, 5B, 6B, 6D, and 6F.

For example, gaming applications 810 can include a fluid rendering application 812, which as described herein can simulate a fluid within an online virtual experience server (e.g., 102). Elements of software in memory 804 can alternatively be stored on any other suitable storage location or computer-readable medium. In addition, memory 804 (and/or other connected storage device(s)) can store instructions and data used in the features described herein. Memory 804 and any other type of storage (magnetic disk, optical disk, magnetic tape, or other tangible media) can be considered "storage" or "storage devices."

I/O interface 806 can provide functions to enable interfacing the server device 800 with other systems and devices. For example, network communication devices, storage devices (e.g., memory and/or data store 120), and input/output devices can communicate via interface 806. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 814 can include a user input device (e.g., a mouse, etc.) that can be used to receive user input, a display device (e.g., screen, monitor, etc.) and/or a combined input and display device, that can be used to provide graphical and/or visual output.

For ease of illustration, FIG. 8 shows one block for each of processor 802, memory 804, I/O interface 806, and software blocks of operating system 808 and gaming application 810. These blocks may represent one or more processors or processing circuitries, operating systems, memories, I/O interfaces, applications, and/or software engines. In other implementations, device 800 may not have all of the components shown and/or may have other elements including other types of elements instead of, or in addition to, those shown herein. While the online virtual experience server 102 is described as performing operations as described in some implementations herein, any suitable component or combination of components of online virtual experience server 102 or similar system, or any suitable processor or processors associated with such a system, may perform the operations described.

A user device can also implement and/or be used with features described herein. Example user devices can be computer devices including some similar components as the device 800, e.g., processor(s) 802, memory 804, and I/O interface 806. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 814, for example, can be connected to (or included in) the device 800 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., methods 300*a*, 300*b*, 300*c*, 400, 500*b*, 600*b*, 600*d*, 600*e*) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating systems.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

The functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

We claim:

1. A computer-implemented method to render a graphical simulation of a fluid in motion in a physical region in a virtual environment, wherein a state of the fluid is calculated in the physical region over consecutive time steps, the method comprising:

- dividing a physical region in a virtual experience into cells, each cell having an initial fluid state, wherein the graphical simulation comprises a shared instance of the virtual experience corresponding to a plurality of players and private instances of the virtual experience for each player of the plurality of players;
- calculating a fluid state for each of the cells at each consecutive time step of a plurality of consecutive time steps, the calculating comprising:
  - determining pre-existing information for each cell to use when updating the fluid state of that cell at the time step, wherein the pre-existing information comprises fluid states of shared cells from the shared instance and fluid states of private cells from the private instances; and
  - recalculating the fluid state for each cell at the time step based on a previous fluid state of the cell and any external force affecting the cell, comprising performing the recalculating for the shared cells based on previous fluid states of the shared cells from the shared instance of the virtual experience and performing the recalculating for the private cells based on previous fluid states of the private cells from corresponding private instances of the virtual experience,
  - wherein the recalculating uses the pre-existing information; and
- rendering the graphical simulation based on the calculated fluid state for each of the cells at each consecutive time step.

2. The method of claim 1, wherein the pre-existing information further comprises information about a cell that supplements the calculated fluid state for the cell, wherein the pre-existing information is used for each cell to substitute for one or more operations otherwise performed during the recalculating.

3. The method of claim 1,

- wherein the pre-existing information further comprises identifiers of cells that are observable by a player's avatar and cells that are unobservable by the player's avatar, based on a location of the player's avatar and a location of the physical region; and
- wherein the recalculating the fluid state comprises performing the recalculating for observable cells at a full precision and performing the recalculating for unobservable cells at a precision lower than the full precision.

4. The method of claim 1, wherein the recalculating is performed via Navier-Stokes equations.

5. The method of claim 4, wherein the recalculating uses a finite difference equation to provide an approximate numerical solution for the recalculating that discretizes the Navier-Stokes equations.

6. The method of claim 1, further comprising:

- receiving an external force applied in a player's private instance to a private cell at a location;
- propagating the external force to one or more proximate shared cells that are within a first threshold distance of the location of the private cell by determining a propagated effect of the external force on each of the proximate shared cells, wherein the propagated effect of the external force decreases as a distance from the location increases;
- converting cells from the proximate shared cells having corresponding propagated effects of the external force exceeding a second threshold into respective converted private cells; and applying the corresponding propagated effects of the external force to the respective converted private cells.

7. The method of claim 1, wherein when an external force is applied in a player's private instance at a location of a shared cell shared by two avatars, the external force only affects that cell in the player's private instance and the shared cell is split into two separate cells, wherein both separate cells are marked as private cells.

8. The method of claim 1, wherein when an external force is applied in a player's private instance at a location of a shared cell shared by more than two avatars, the external force only affects that cell in the player's private instance, that cell in the player's private instance is marked as a separate private cell, and the shared cell is modified in the shared instance to indicate that the shared cell remains shared in any other players' private instances that shared the shared cell prior to the external force being applied.

9. The method of claim 1, further comprising periodically comparing the fluid state of each private cell and the fluid state of a shared cell at corresponding locations in the physical region and returning the private cell to a shared state when a numerical metric of differences between the fluid states of the private cell and the shared cell at a same location in the physical region at a same time step is less than a threshold.

10. The method of claim 1, wherein the pre-existing information further comprises a cache of recent fluid states for each of the cells in the physical region at consecutive time steps and a cached digest summarizing each of the recent fluid states for each of the cells in the physical region in the cache at the consecutive time steps, and wherein the recalculating further comprises:

after recalculating the fluid states for each of the cells in the physical region at a time step, comparing a digest summarizing the fluid states for the cells in the physical region at the time step to the cached digest; and if the digest summarizing the fluid states for the cells in the physical region matches the cached digest for the cells in the physical region, using corresponding cached recent fluid states from the cache for the cells in the physical region to substitute for the recalculating by repeating the cached recent fluid states for the corresponding cells in the physical region as results of the recalculating until a time step occurs having an external force that affects at least one cell in the physical region.

11. The method of claim 1, wherein the pre-existing information further comprises a cache of recent fluid states for each cell of a subset of cells in the physical region at consecutive time steps and a cached digest summarizing each of the recent fluid states for each cell of the subset of cells in the physical region in the cache at the consecutive time steps, and wherein the recalculating further comprises:

after recalculating the fluid state for each cell of the subset of cells in the physical region at a time step, comparing a digest summarizing the fluid states for the subset of cells in the physical region at the time step to the cached digest; and if the digest summarizing the fluid states for the subset of cells in the physical region matches the cached digest for the subset of cells in the physical region, using corresponding cached recent fluid states from the cache for the subset of cells in the physical region to substitute for the recalculating for the subset of cells in the physical region by repeating the cached recent fluid states for the subset of cells in the physical region as results of the recalculating until a time step occurs having an external force that affects at least one cell in the subset of cells in the physical region.

12. A non-transitory computer-readable medium comprising instructions that, responsive to execution by a processing device, cause the processing device to perform operations comprising:

dividing a physical region in a virtual experience into cells, each cell having an initial fluid state, wherein a graphical simulation comprises a shared instance of the virtual experience corresponding to a plurality of players and private instances of the virtual experience for each player of the plurality of players;

calculating a fluid state for each of the cells at each consecutive time step of a plurality of consecutive time steps, the calculating comprising:

determining pre-existing information for each cell to use when updating the fluid state of that cell at the time step, wherein the pre-existing information comprises fluid states of shared cells from the shared instance and fluid states of private cells from the private instances; and recalculating the fluid state for each cell at the time step based on a previous fluid state of the cell and any external force affecting the cell, comprising performing the recalculating for the shared cells based on previous fluid states of the shared cells from the shared instance of the virtual experience and performing the recalculating for the private cells based on previous fluid states of the private cells from corresponding private instances of the virtual experience, wherein the recalculating uses the pre-existing information; and rendering the graphical simulation based on the calculated fluid state for each of the cells at each consecutive time step.

13. The non-transitory computer-readable medium of claim 12, wherein the pre-existing information further comprises identifiers of cells that are observable by a player's avatar and cells that are unobservable by the player's avatar, based on a location of the player's avatar and a location of the physical region; and wherein the recalculating the fluid state comprises performing the recalculating for observable cells at a full precision and performing the recalculating for unobservable cells at a precision lower than the full precision.

14. The non-transitory computer-readable medium of claim 12, wherein the recalculating is performed via Navier-Stokes equations.

15. The non-transitory computer-readable medium of claim 12, wherein the pre-existing information further comprises a cache of recent fluid states for each of the cells in the physical region at consecutive time steps and a cached digest summarizing each of the recent fluid states for each of the cells in the physical region in the cache at the consecutive time steps, and wherein the recalculating further comprises:

after recalculating the fluid states for each of the cells in the physical region at a time step, comparing a digest summarizing the fluid states for the cells in the physical region at the time step to the cached digest; and if the digest summarizing the fluid states for the cells in the physical region matches the cached digest for the cells in the physical region, using corresponding cached recent fluid states from the cache for the cells in the physical region to substitute for the recalculating by repeating the cached recent fluid states for the corresponding cells in the physical region as results of the recalculating until a time step occurs having an external force that affects at least one cell in the physical region.

16. The non-transitory computer-readable medium of claim 12, wherein the pre-existing information is used for each cell to substitute for one or more operations otherwise performed during the recalculating.

17. A system comprising:

a memory with instructions stored thereon; and a processing device, coupled to the memory, the processing device configured to access the memory and execute the instructions, wherein the instructions cause the processing device to perform operations comprising:

dividing a physical region in a virtual experience into cells, each cell having an initial fluid state, wherein a graphical simulation comprises a shared instance of the virtual experience corresponding to a plurality of players and private instances of the virtual experience for each player of the plurality of players;

calculating a fluid state for each of the cells at each consecutive time step of a plurality of consecutive time steps, the calculating comprising:

determining pre-existing information for each cell to use when updating the fluid state of that cell at the time step, wherein the pre-existing information comprises fluid states of shared cells from the shared instance and fluid states of private cells from the private instances; and recalculating the fluid state for each cell at the time step based on a previous fluid state of the cell and any external force affecting the cell, comprising performing the recalculating for the shared cells based on previous fluid states of the shared cells from the shared instance of the virtual experience and performing the recalculating for the private cells based on previous fluid states of the private cells from corresponding private instances of the virtual experience, wherein the recalculating uses the pre-existing information; and rendering the graphical simulation based on the calculated fluid state for each of the cells at each consecutive time step.

18. The system of claim 17, wherein the pre-existing information further comprises identifiers of cells that are observable by a player's avatar and cells that are unobservable by the player's avatar, based on a location of the player's avatar and a location of the physical region; and wherein the recalculating the fluid state comprises performing the recalculating for observable cells at a full precision and performing the recalculating for unobservable cells at a precision lower than the full precision.

19. The system of claim 17, wherein the recalculating is performed via Navier-Stokes equations.

20. The system of claim 17, wherein the pre-existing information further comprises a cache of recent fluid states for each of the cells in the physical region at consecutive time steps and a cached digest summarizing each of the recent fluid states for each of the cells in the physical region in the cache at the consecutive time steps, and wherein the recalculating further comprises:

after recalculating the fluid states for each of the cells in the physical region at a time step, comparing a digest summarizing the fluid states for the cells in the physical region at the time step to the cached digest; and if the digest summarizing the fluid states for the cells in the physical region matches the cached digest for the cells in the physical region, using corresponding cached recent fluid states from the cache for the cells in the physical region to substitute for the recalculating by repeating the cached recent fluid states for the corresponding cells in the physical region as results of the recalculating until a time step occurs having an external force that affects at least one cell in the physical region.

* * * * *